United States Patent
Lane et al.

(10) Patent No.: US 11,207,628 B2
(45) Date of Patent: Dec. 28, 2021

(54) PROCESSES AND DEVICES FOR SEPARATING ENTRAINMENT FROM SULPHURIC ACID PLANT PROCESS GAS

(71) Applicant: NORAM Engineering and Constructors Ltd., Vancouver (CA)

(72) Inventors: Christopher Lane, Vancouver (CA); Hongtao Lu, Richmond (CA); Brian Robert Ferris, Vancouver (CA); Andrés Mahecha-Botero, Vancouver (CA); Bradley Wayne Morrison, Maple Ridge (CA); Jatinderpal Singh Sandhu, Surrey (CA); Inez Karina Tanu, Vancouver (CA); Charles Guy Cooper, Vancouver (CA)

(73) Assignee: NORAM Engineering and Constructors Ltd., Vancouver (CA)

( * ) Notice: Subject to any disclaimer, the term of this patent is extended or adjusted under 35 U.S.C. 154(b) by 99 days.

(21) Appl. No.: 16/584,593

(22) Filed: Sep. 26, 2019

(65) Prior Publication Data

US 2020/0101407 A1   Apr. 2, 2020

Related U.S. Application Data

(60) Provisional application No. 62/737,726, filed on Sep. 27, 2018.

(51) Int. Cl.
*B01D 45/00* (2006.01)
*B01D 45/16* (2006.01)
(Continued)

(52) U.S. Cl.
CPC ............. *B01D 45/16* (2013.01); *B01D 45/08* (2013.01); *B01D 45/12* (2013.01); *C01B 17/90* (2013.01); *B01D 50/002* (2013.01)

(58) Field of Classification Search
CPC ........ B01D 45/16; B01D 45/08; B01D 45/12; B01D 50/002; C01B 17/90
See application file for complete search history.

(56) References Cited

U.S. PATENT DOCUMENTS

| | | | | | |
|---|---|---|---|---|---|
| 1,360,349 | A | * | 11/1920 | Wright | ...................... B04C 3/00 55/457 |
| 2,323,707 | A | * | 7/1943 | Danz | ........................ B04C 3/04 55/347 |

(Continued)

OTHER PUBLICATIONS

Anderson, J.R. et al., "The Use of Compressor-Inlet Prewhirl for the Control of Small Gas Turbines", presented at the Aviation and Space, Hydraulic, and Gas Turbine Conference and Products Show, Los Angeles, CA, Mar. 3-7, 1963, The American Society of Mechanical Engineers.

(Continued)

*Primary Examiner* — Dung H Bui
(74) *Attorney, Agent, or Firm* — Oyen Wiggs Green & Mutala LLP

(57) ABSTRACT

Sulphuric acid plants, separators for separating entrainment for process gas, and gas treatment processes for generating sulphuric acid are provided. The sulphuric acid plant comprises a source of process gas, an entrainment eliminator, a gas rotator located downstream of the gas-liquid contactor, and a separator located downstream of the entrainment eliminator and upstream of the gas rotator. The separator comprises a plurality of passages. Each passage comprises a vane extending longitudinally along the passage, wherein each vane rotates a process gas flowing through the separator. The process comprises transferring process gas from an entrainment eliminator to a separator located downstream of the entrainment eliminator, rotating the process gas through the separator to separate entrainment, and transfer- (Continued)

ring the separated process gas from the separator to rotating equipment located downstream of the separator.

21 Claims, 17 Drawing Sheets

(51) Int. Cl.
*C01B 17/90* (2006.01)
*B01D 45/12* (2006.01)
*B01D 45/08* (2006.01)
*B01D 50/00* (2006.01)

(56) References Cited

U.S. PATENT DOCUMENTS

| | | | | |
|---|---|---|---|---|
| 3,444,562 A * | 5/1969 | Chalfin | ............... | A41F 9/02 |
| | | | | 2/338 |
| 3,469,566 A * | 9/1969 | Wilkinson | ............ | F02M 35/022 |
| | | | | 60/317 |
| 3,590,560 A * | 7/1971 | Pall | ............ | B04C 3/00 |
| | | | | 55/457 |
| 3,713,279 A * | 1/1973 | Moore | ............ | B01D 45/16 |
| | | | | 55/319 |
| 3,915,679 A * | 10/1975 | Roach | ............ | B04C 3/06 |
| | | | | 55/347 |
| 3,922,108 A | 11/1975 | Benisek | | |
| 4,008,059 A * | 2/1977 | Monson | ............ | B01D 45/14 |
| | | | | 55/396 |
| 4,289,611 A * | 9/1981 | Brockmann | ............ | B04C 3/04 |
| | | | | 209/710 |
| 4,311,494 A * | 1/1982 | Conner | ............ | B01D 45/16 |
| | | | | 55/394 |
| 5,403,367 A * | 4/1995 | De Villiers | ............ | B01D 45/16 |
| | | | | 55/320 |
| 6,540,917 B1 * | 4/2003 | Rachels | ............ | B04C 3/00 |
| | | | | 210/512.1 |
| 6,994,518 B2 | 2/2006 | Simon et al. | | |
| 7,879,123 B2 * | 2/2011 | Lundquist | ............ | B01D 45/16 |
| | | | | 55/456 |
| 8,425,641 B2 * | 4/2013 | Chaudhari | ............ | B04C 3/06 |
| | | | | 55/319 |
| 10,786,775 B2 * | 9/2020 | Oberli | ............ | B01D 45/16 |
| 10,828,590 B2 * | 11/2020 | Suzuki | ............ | B01D 45/12 |
| 10,881,996 B2 * | 1/2021 | Suzuki | ............ | F02M 35/10 |

OTHER PUBLICATIONS

"Improving Fan System Performance: A Sourcebook for Industry", The United States Department of Energy Air Movement and Control Association International, Inc., Apr. 2003.
http://www.sulphuric-acid.com/techmanual/contact/contact_blowers.htm, Apr. 24, 2004.

* cited by examiner

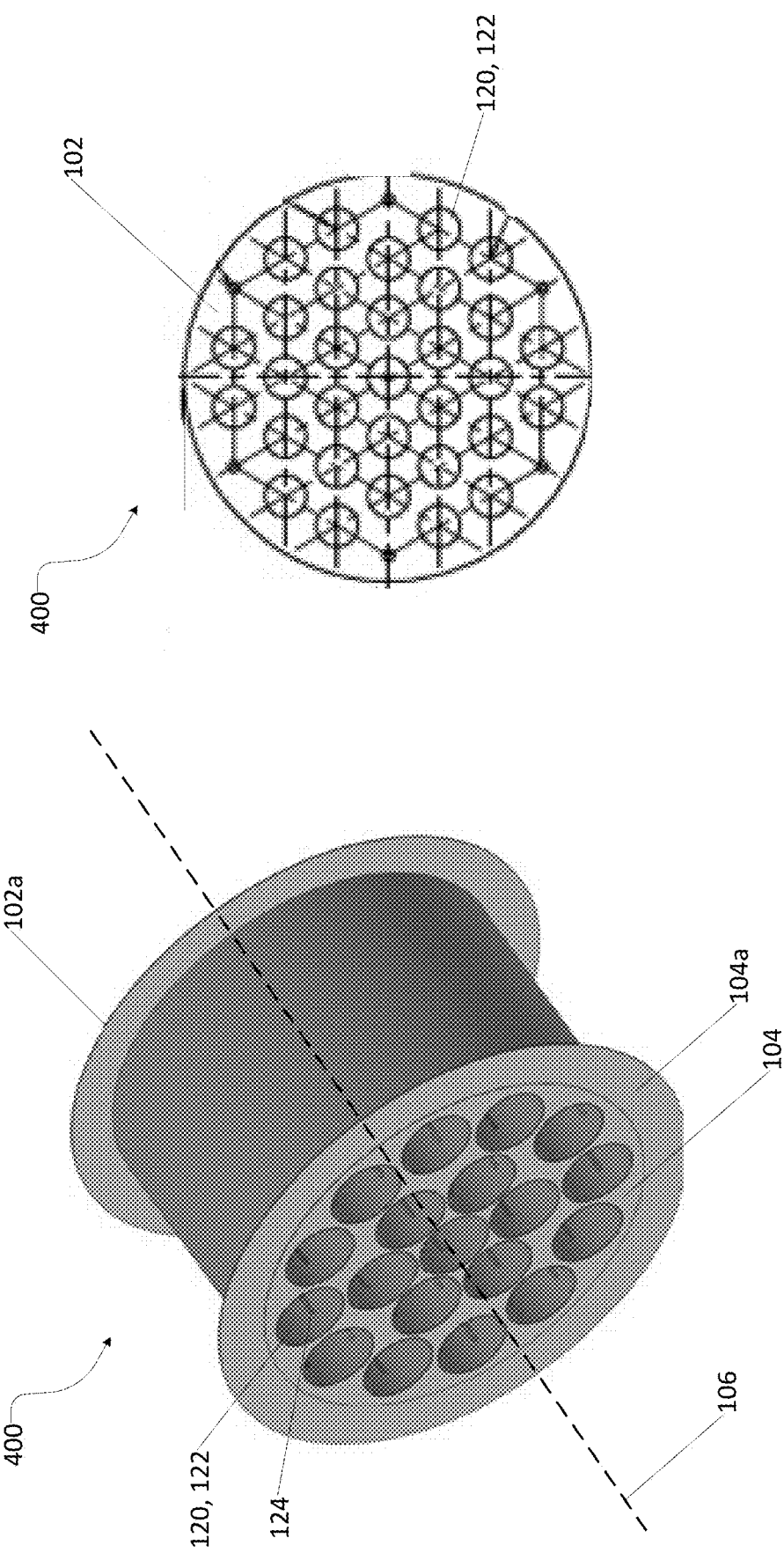

PROCESSES AND DEVICES FOR SEPARATING ENTRAINMENT FROM SULPHURIC ACID PLANT PROCESS GAS

CROSS-REFERENCE TO RELATED APPLICATION

This application claims the benefit under 35 U.S.C. § 119 of U.S. application No. 62/737,726 filed 27 Sep. 2018 and entitled PROCESSES AND DEVICES FOR SEPARATING ENTRAINMENT FROM SULPHURIC ACID PLANT PROCESS GAS which is hereby incorporated herein by reference for all purposes.

TECHNICAL FIELD

The present invention relates to gas treatment processes and devices for separating entrainment from process gas and/or preconditioning process gas for downstream operations. The processes and devices of the present invention have particular application to sulphuric acid plants.

BACKGROUND

Sulphuric acid plants may experience acid mist (i.e. entrainment) carryover from sulphuric acid towers during production. Even though downstream equipment is typically made from corrosion resistant materials acid entrainment can significantly decrease the service life of downstream equipment. Repairing and replacing equipment that has been damaged by corrosion is expensive. Premature equipment failure can affect safety of personnel and may necessitate undesirable plant shut down leading to productivity losses.

Proper acid tower design, maintenance, and operation impact overall plant performance and economics. Running an acid tower outside design conditions can lead to entrainment carryover into downstream equipment (e.g. rotating equipment) resulting in corrosion, crusting of catalyst beds, and excessive acid in the plant where it is detrimental to plant performance.

Corrosion is the leading cause of equipment failure in acid plants due to high operating temperatures and chemicals present in acid process equipment. Accordingly, significant maintenance is routinely required.

Removing entrained liquids from process gas in acid plants is critical to minimizing downstream problems related to acid condensation and corrosion. Removing entrained liquids can also help to avoid undesirable atmospheric emissions to meet increasingly tight environmental regulations and/or to recover valuable acid from the process gas stream.

Tower performance may be improved by employing an entrainment eliminator. Many different entrainment eliminator options are commonly known. Three mechanisms are generally used to capture entrainment—impaction, interception, and Brownian diffusion. Example entrainment eliminators include:

Chevron Demisters and Mesh-Pad Demisters: Process vessels may be used to capture entrainment via direct impaction mechanisms. Since such devices typically require a large cross sectional area to accommodate the device, it can be difficult to retrofit such devices to existing plants or processes.

Knock-Out Drums: Empty process vessels may be used to capture entrainment via interception. Such knock-out drums may be fit with mesh-pad demisters. It can be difficult to retrofit such devices to existing plants since they require the addition of a new process vessel.

Brownian diffusion demisters: Such demisters rely on Brownian motion to capture entrainment having micron and sub-micron particle sizes via diffusion. Typically, low gas velocity and/or large surface area and/or a large pressure drop across the device are required.

High-Intensity Direct Contact Scrubbers: Such scrubbers have various configurations including reverse-jet, Venturi, and fluidized bed. A variety of scrubbing chemicals are employed by such scrubbers. The scrubbers require large process vessels, pumps, and continuous liquid recirculation.

Wet Electrostatic Precipitators (WESPs): An electrical current is used to capture entrainment having sub-micron particle sizes. Such eliminators require large process vessels and electrical controls.

The devices above may foul due to accumulation of corrosion byproducts, necessitating pre-mature equipment maintenance or replacement, and potentially causing undesirable plant shut-downs.

Further, such devices may disadvantageously cause large pressure drops across the device which must be restored by rotating equipment. Typical entrainment eliminators induce a pressure drop in the range of about 10 to about 20 inches WC (i.e. about 0.36 psi to about 0.72 psi or about 2.5 kPA to about 5 kPA). For many sulphuric acid plants, the largest operating cost is the operation of rotating equipment (e.g. blowers, etc.) to deliver gas through the plant or process. Thus, the production capacity and/or overall efficiency of the plant or process typically depend on rotating equipment efficiency. Pressure drop caused by entrainment eliminators can undesirably increase sulphuric acid plant production costs associated with power consumption.

In some sulphuric acid plants, installed entrainment eliminators may not adequately separate entrainment from process gas. Reasons for this may include: the eliminator has not been adequately maintained; the design of the eliminator is insufficient to meet entrainment demands of the sulphuric acid plant or component(s) thereof; and operating conditions of the sulphuric acid plant are modified and the eliminator is no longer able to meet entrainment demands of the sulphuric acid plant or component(s) thereof.

Some types of entrainment eliminator are expensive to add to an existing plant, for example because they require significant modifications to existing process equipment and/or system configuration and/or require a new civil foundation to accommodate the device. A large amount of space is typically required to accommodate such devices and/or civil foundation. Installation of such devices may also trigger special permitting requirements in some jurisdictions, impeding plant operation.

There is a general desire for gas treatment processes and devices that minimize downstream problems related to acid condensation and corrosion while minimizing pressure drop.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

The present invention relates to gas treatment processes and devices for removing entrainment from process gas. The processes and devices of the present invention have particular application to sulphuric acid plants. Some embodiments minimize downstream problems related to acid condensation and corrosion while minimizing pressure drop. Entrainment may be removed from process gas by installing a separator according to the present invention to existing plant or process equipment. The separator may be configured to precondition process gas for downstream operations and/or to remove entrainment to prevent plugging and/or clogging of downstream separation equipment.

The invention has a number of aspects including, without limitation:
  separators from removing entrainment such as sulphuric acid from process gas;
  methods for removing entrainment such as sulphuric acid from process gas; and
  sulphuric acid plants including entrainment removal systems.

One aspect of the invention provides a sulphuric acid plant comprising a source of process gas, an entrainment eliminator, a gas rotator located downstream of the gas-liquid contactor, and a separator located downstream of the entrainment eliminator and upstream of the gas rotator. The separator comprises a plurality of passages. Each passage comprises a vane extending longitudinally along the passage, wherein each vane rotates a process gas flowing through the separator.

In some embodiments the source of process gas comprises one or more of a dry tower, a quench tower, an absorption tower, and a gas cooling tower.

In some embodiments the vane comprises a positive vane angle to rotate the process gas in essentially the same direction as a desired rotation of a gas flow at an inlet end of the gas rotator.

In some embodiments the vane comprises about 0.5 to about 3 twists.

In some embodiments the vane comprises one twist.

In some embodiments the sulphuric acid plant comprises a gas transfer system for transferring the process gas from the entrainment eliminator to the separator, wherein the separator is located in-line with the gas transfer system.

In some embodiments the total cross sectional area of the plurality of passages is approximately equal to the cross sectional area of the gas transfer system located in-line with the separator.

In some embodiments each passage comprises an inside surface for collecting entrainment having particle sizes greater than about 2 microns.

In some embodiments each passages comprises an inside surface for collecting entrainment having particle sizes in the range of about 3 microns to about 100 microns.

In some embodiments the separator separates entrainment from the process gas with a pressure drop across the separator of less than about 5 kPa.

In some embodiments the separator separates entrainment from the process gas with a pressure drop across the separator of less than about 2.5 kPa.

In some embodiments the separator separates entrainment from the process gas with a pressure drop across the separator of less than about 1.2 kPa.

In some embodiments the separator separates entrainment from the process gas with a pressure drop across the separator of less than about 750 Pa.

Another aspect of the present invention provides a sulphuric acid plant comprising a source of process gas, a separator located downstream of the source of process gas, and a gas transfer system for transferring the process gas from the source of process gas to the separator. The separator is located in-line with the gas transfer system to separate entrainment from the process gas with a pressure drop across the separator of less than about 5 kPa.

In some embodiments the pressure drop across the separator is less than about 2.5 kPa.

In some embodiments the pressure drop across the separator is less than about 1.2 kPa.

In some embodiments the pressure drop across the separator is less than about 750 Pa.

In some embodiments the sulphuric acid plant comprises a gas rotator located downstream of the separator.

In some embodiments the sulphuric acid plant comprises an entrainment eliminator located upstream of the separator.

In some embodiments the sulphuric acid plant comprises an entrainment eliminator located downstream of the separator and upstream of the rotating equipment.

In some embodiments the source of process gas comprises a dry sulphuric acid tower.

In some embodiments the entrainment has particle sizes greater than about 2 microns.

In some embodiments the entrainment has particle sizes in the range of about 3 microns to about 100 microns.

Another aspect of the present invention provides a separator for separating entrainment from a process gas. The separator comprises a plurality of tubes extending along a longitudinal axis of the separator. Each tube comprises a vane extending longitudinally along the tube, wherein each vane rotates a process gas flowing through the separator.

In some embodiments a pressure drop of the process gas flowing across the separator is less than about 5 kPa.

In some embodiments the pressure drop of the process gas flowing across the separator is less than about 2.5 kPa.

In some embodiments the pressure drop of the process gas flowing across the separator is less than about 1.2 kPa.

In some embodiments the pressure drop of the process gas flowing across the separator is less than about 750 Pa.

In some embodiments the vane comprises a positive vane angle to rotate the process gas in essentially the same direction as a desired rotation of a gas flow at an inlet end of the gas rotator.

In some embodiments the vane comprises about 0.5 to about 3 twists.

In some embodiments the vane comprises one twist.

In some embodiments each tube comprises an inside surface for collecting entrainment separated from the process gas.

In some embodiments the separator comprises a drain for removing the separated entrainment from the separator.

Another aspect of the present invention provides a gas treatment process for generating sulphuric acid. The process comprises transferring process gas from an entrainment eliminator to a separator located downstream of the entrainment eliminator, rotating the process gas through the separator to separate entrainment, and transferring the separated process gas from the separator to rotating equipment located downstream of the separator.

In some embodiments rotating the process gas comprises rotating the process gas in essentially the same direction as a desired rotation of a gas flow at an inlet end of the rotating equipment.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 7A is a bottom, side perspective view of a separator according to an example embodiment of the present invention.

FIG. 7B is a partial bottom cross-sectional view of the separator shown in FIG. 7A.

DESCRIPTION

Figure 1:
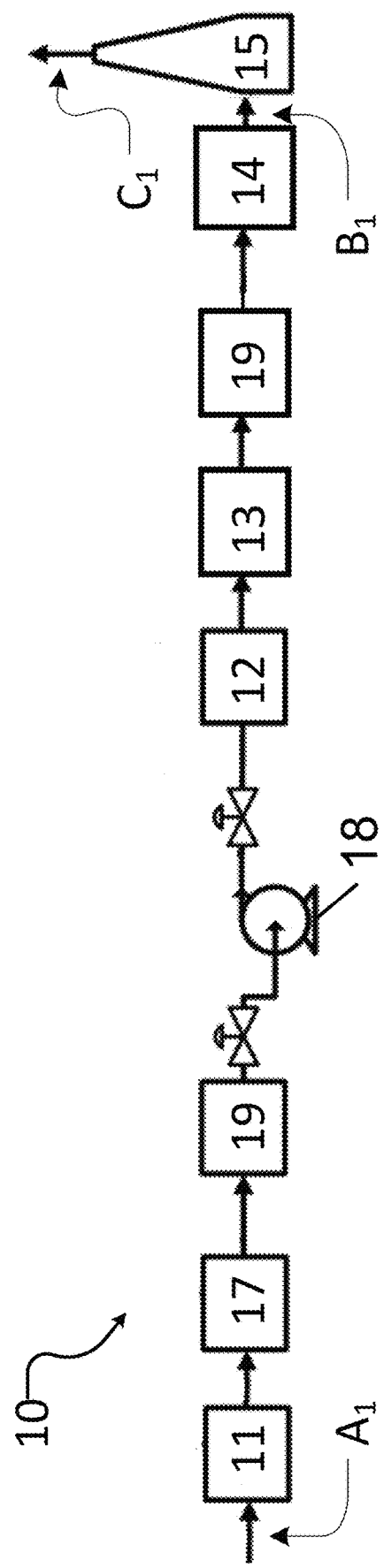
FIG. 1 is a schematic illustration of a typical prior art sulphuric acid plant.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Unless context dictates otherwise, "sulphuric acid" ($H_2SO_4$) (as used herein) includes liquid sulphuric acid, liquid sulphuric acid droplets, liquid sulphuric acid particles, and sulphuric acid aerosols.

Unless context dictates otherwise, "entrainment" (as used herein) means a liquid carried by a flow of process gas. Entrainment includes liquid slugs, liquid droplets, liquid particles, fine liquid mist, and liquid aerosols.

Unless context dictates otherwise, "process gas" (as used herein) includes gas that has been generated in and/or processed by a gas treatment system or component(s) thereof, including (but not limited to) gas that has been processed by a sulphuric acid plant or component(s) thereof. Persons skilled in the art will understand process gas to include, by way of non-limiting example, gas that has been processed by a gas treatment system or industrial process plant or component(s) thereof, gas produced by combustion, and gas produced by metallurgical processing.

Unless context dictates otherwise, "feedstock" (as used herein) means a raw material supplied to an industrial process, such as a gas treatment system, or component(s) thereof.

Unless context dictates otherwise, "inlet" and "inlet end" (as used herein in relation to a gas treatment system and components thereof) mean the location(s) wherein gas to be treated is introduced into the gas treatment system or components thereof.

Unless context dictates otherwise, "outlet" and "outlet end" (as used herein in relation to a gas treatment system and components thereof) mean the location(s) wherefrom treated gas exists the gas treatment system or components thereof.

Unless context dictates otherwise, "upstream" (as used herein in relation to a gas treatment system and components thereof) means a position that is in a direction opposite to a direction of gas flow in a gas treatment system in normal operation.

Unless context dictates otherwise, "downstream" (as used herein in relation to a gas treatment system and components thereof) means a position opposite to upstream, i.e. a position that is in the same direction as a direction of gas flow in a gas treatment system in normal operation.

Unless the context dictates otherwise, "plant" (as used herein) refers to a distinct industrial site for carrying on industrial processes.

Unless the context dictates otherwise, "sulphuric acid plant" (as used herein) refers to any plant that generates sulphuric acid, including (without limitation) sulphur-burning sulphuric acid plants, metallurgical sulphuric acid plants, sulphuric acid regeneration plants, acid gas treatment sulphuric acid plants, and wet sulphuric acid plants.

Unless the context dictates otherwise, "rotating equipment" (as used herein) refers to mechanical components or devices that move liquids or gases through process equipment. Examples include, but are not limited to, pumps, compressors, fans, and blowers.

Unless context dictates otherwise, "fouling" (as used herein) refers to the accumulation of unwanted material on the solid surface(s) of a piece of equipment.

Unless the context dictates otherwise, the terms "radially outward", "radially outwardly", and/or the like (as used herein) refer to directions that extend generally orthogonal to and away from a longitudinal axis of a device (e.g. longitudinal axis 106 of separator 100 FIG. 7A) or, where the context dictates, have components that extend generally orthogonal to and away from a longitudinal axis.

Unless the context dictates otherwise, the terms "radially inward", "radially inwardly", and/or the like (as used herein) refer to directions that extend generally orthogonal and toward a longitudinal axis of a device (e.g. longitudinal axis 106) or, where the context dictates, have components that extend generally orthogonal to and toward the longitudinal axis.

Unless the context dictates otherwise, the terms "radial", "radially", and/or the like (as used herein) refer to directions that are either radially inward, radially outward, or both. Although the term "radial" is most commonly used in connection with circular objects or features, it should be understood for the purpose of this description and accompanying aspects that the term "radial" is used in a broader context and is not limited to describing strictly circular objects or features or objects or features with strictly circular cross-section.

Unless context dictates otherwise, "pitch" (as used herein) means the longitudinal distance between a point on a vane and the corresponding point on an adjacent vane.

Unless context dictates otherwise, "about" (as used herein) means near a stated value (i.e. within±20% of the stated value).

Some embodiments of the present invention provide gas treatment processes and devices to reduce or eliminate entrainment from process gas, thereby increasing the efficiency and/or effective lifespan of downstream operations equipment. The processes and devices are well-suited for separating entrainment (e.g. $H_2SO_4$) having a liquid density that is higher than that of water and/or for separating entrainment without inducing a large added pressure drop. Accordingly, the processes and devices are well-suited to being used in combination with other entrainment eliminators. For example, devices as described herein may be provided: upstream of conventional entrainment eliminators and/or upstream of rotating equipment and/or downstream of a conventional entrainment eliminator and upstream of rotating equipment.

FIG. 1 shows a typical prior art sulphuric acid plant 10. A feedstock $A_1$ is fed to gas handling processes 11 of sulphuric acid plant 10. Feedstock $A_1$ may comprise one or more of combustion gas, air feed, dilution gas, quench gas, and a feedstock (including, but not limited to, sulphur, acid gas, metallurgical off-gas, and furnace off-gas). Persons skilled in the art will recognize that the specific nature of gas handling processes 11 depend on the configuration of sulphuric acid plant 10. For example, for a metallurgical sulphuric acid plant, gas handling processes 11 may include one or more of gas cleaning, heat exchange, gas compression, and gas drying unit operations. For an acid regeneration plant, gas handling processes 11 may include one or more of heating in a regeneration furnace, gas cleaning, heat exchange gas compression, and gas drying unit operations. For a sulphur-burning acid plant, gas handling processes 11 may include one or more of gas compression, gas drying, sulphur burning, and heat exchange unit operations.

Sulphuric acid plant 10 includes at least one stage of catalytic conversion and/or at least one stage of absorption or condensation. Some sulphuric acid plants include a catalytic converter 12 and an absorption/condensation stage 13. Catalytic converter 12 facilitates the following reaction:

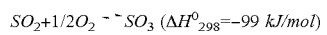

$SO_2+1/2O_2 \rightleftarrows SO_3$ ($\Delta H^0_{298}$=−99 $kJ/mol$)

Absorption/condensation stage 13 facilitates the following hydration reaction:

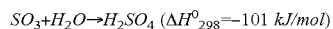

$SO_3+H_2O \rightarrow H_2SO_4$ ($\Delta H^0_{298}$=−101 $kJ/mol$)

Converter 12 is typically located upstream of absorption/condensation stage 13 and downstream of gas handling processes 11. Catalytic converter 12 may include catalytic conversion and gas cooling unit operations. In some sulphuric acid plants, one to five catalytic conversion stages are provided. At least one stage of catalytic converter 12 typically includes a high-vanadium catalyst in a packed bed. Catalytic converter 12 may be of adiabatic or quasi-isothermal configuration.

Absorption/condensation stage 13 may include gas cooling, absorption and/or condensation unit operations. In some sulphuric acid plants, one or more stages of absorption or condensation are provided.

Some sulphuric acid plants provide a prior art entrainment eliminator 19 downstream of absorption/condensation stage 13. In such sulphuric acid plants, at least one stage of absorption/condensation stage 13 comprises a gas-liquid contactor 13A such as a packed tower, and/or an indirect contact condenser.

Sulphuric acid plant 10 includes a sulphuric acid plant gas stack 15 at an outlet end thereof. Tail gas $B_1$ produced by sulphuric acid plant 10 may be fed into gas stack 15 before it is discharged as gas $C_1$ to the environment. Sulphuric acid plant 10 further includes one or more downstream processes 14 located upstream of gas stack 15. Downstream processes 14 may include an absorption/condensation stage and/or tail gas scrubbing. Sulphuric acid plant 10 further includes a gas dryer or dry tower 17 located upstream of catalytic converter 12, a gas blower 18 located upstream of catalytic converter 12, and an air inlet 16 located upstream of catalytic converter 12.

In some sulphuric acid plants, a prior art entrainment eliminator 19 is provided downstream of gas dryer or dry tower 17 and upstream of gas blower 18. Entrainment eliminator(s) 19 may create an undesired pressure drop across the eliminator. If plant capacity is increased, and/or if eliminator 19 is poorly performing, then entrainment eliminator 19 may be inadequate to remove entrainment. Entrainment can cause problems to downstream equipment and/or undesirable atmospheric emissions as described elsewhere herein. To minimize downstream problems related to acid condensation and corrosion, entrainment eliminator 19 typically requires frequent replacement or restoration which may require undesirable plant shut downs.

Figure 2:
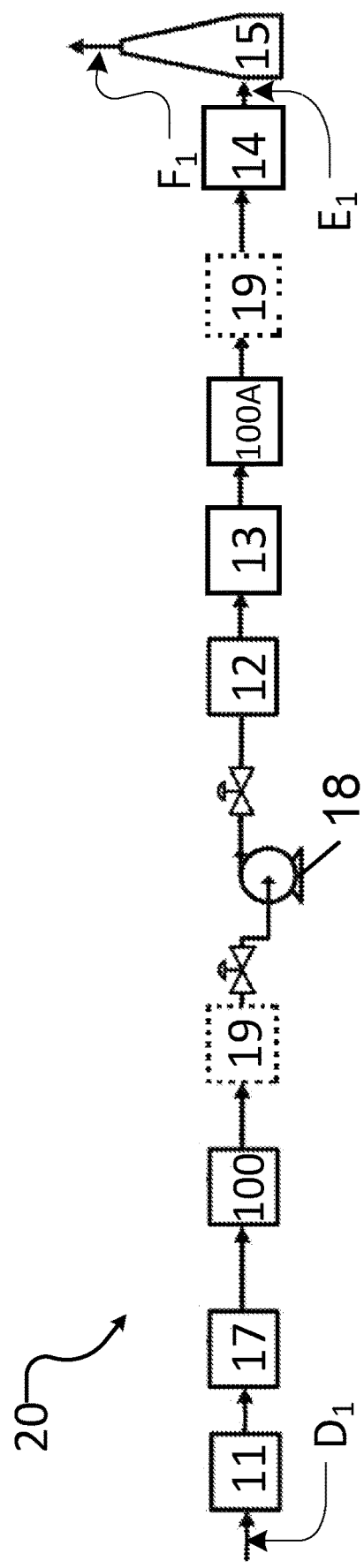
FIG. 2 is a schematic illustration of a sulphuric acid plant according to an example embodiment of the present invention.

A sulphuric acid plant 20 according to an example embodiment of the present invention is shown in FIG. 2. Many features and components of plant 20 are similar to features and components of plant 10, with the same reference numerals being used to indicate similar features and components. Sulphuric acid plant 20 is similar to sulphuric acid plant 10 but has been modified to include an entrainment separator 100.

In the FIG. 2 embodiment, separator 100 is located downstream of dry tower 17 and upstream of gas blower 18. In this location, separator 100 separates sulphuric acid entrained by dry tower 17. Providing separator 100 helps to prevent corrosion and/or fouling of downstream equipment and/or to reduce the energy requirements of downstream gas blower 18 while maintaining throughput and/or to maintain the energy requirements of blower 18 while improving throughput.

As described elsewhere herein, separator 100 separates entrainment without inducing a large added pressure drop. Accordingly, in this location, entrainment may be removed from process gas without the need for excessive power consumption by gas blower 18 and/or wear and tear on the gas blower 18.

In some embodiments, a separator 100 is located upstream and/or downstream of a conventional entrainment eliminator 19. Upstream of entrainment eliminator 19, separator 100 separates larger particles of entrainment to improve efficiency of eliminator 19 and/or prevent corrosion and/or fouling of eliminator 19 and/or reduce the amount of sulphuric acid discharged to the environment. Downstream of entrainment eliminator 19, separator 100 may improve the overall separation of liquid from process gas. For example, separators 100 may optionally be provided both upstream and downstream of a conventional entrainment eliminator 19.

As shown in FIG. 2, a sulphuric acid plant may optionally include plural separators 100. The separators 100 may be provided in more than one location. For example, in the FIG. 2 embodiment, a first separator 100 is located downstream of dry tower 17 and a second separator 100 (i.e., an additional separator 100A) is located downstream of absorption/condensation stage 13. Separator(s) 100 may be located at one or more locations downstream of operations involving contact between liquid and gas, such as gas-liquid contactors, wells, towers, scrubbers, columns, condensers, evaporators, coalescers, and the like. Example locations include (without limitation):

downstream of a gas-liquid contactor of a gas cleaning section of a metallurgical or acid regeneration sulphuric acid plant. In this location, separator 100 captures low concentration sulphuric acid entrained by the contact stage to improve plant performance.

downstream of a dry sulphuric acid tower of a sulphuric acid plant. In this location, separator 100 may be operative to remove entrainment to prevent corrosion and/or fouling of downstream equipment and/or to improve the operating efficiency of downstream rotating equipment.

downstream of a final acid tower of a sulphuric acid plant. In this location, separator 100 may be operative to remove entrainment to prevent corrosion and/or fouling of downstream equipment and/or to reduce the amount of sulphuric acid discharged to the environment.

downstream of a tail gas scrubber of a sulphuric acid plant. In this location, separator 100 may be operative to remove entrained liquid (e.g. peroxide ($H_2O_2$), ammonia ($NH_3$), sodium hydroxide (NaOH), amines, etc.) to reduce the loss of scrubbing chemicals and/or to reduce the amount of such chemicals discharged to the environment.

downstream of a conventional entrainment eliminator. In this location, separator 100 may be operative to remove excess entrainment from process gas separated by the entrainment eliminator.

In some embodiments, separator 100 is located upstream of operations for further processing and/or rotating process gas. In this location, separator 100 may be operative to increase the efficiency and/or effective lifespan of downstream equipment and/or to precondition (i.e. rectify and/or pre-whirl) process gas being supplied to downstream rotating equipment to increase the mechanical efficiency of the rotating equipment. For example, energy requirements of the rotating equipment may be reduced while maintaining throughput or energy requirements may be maintained while improving throughput. Example locations include (without limitation):

upstream of a conventional entrainment eliminator;

upstream of rotating equipment;

upstream of the main gas blower of a sulphuric acid plant.

Figure 3:
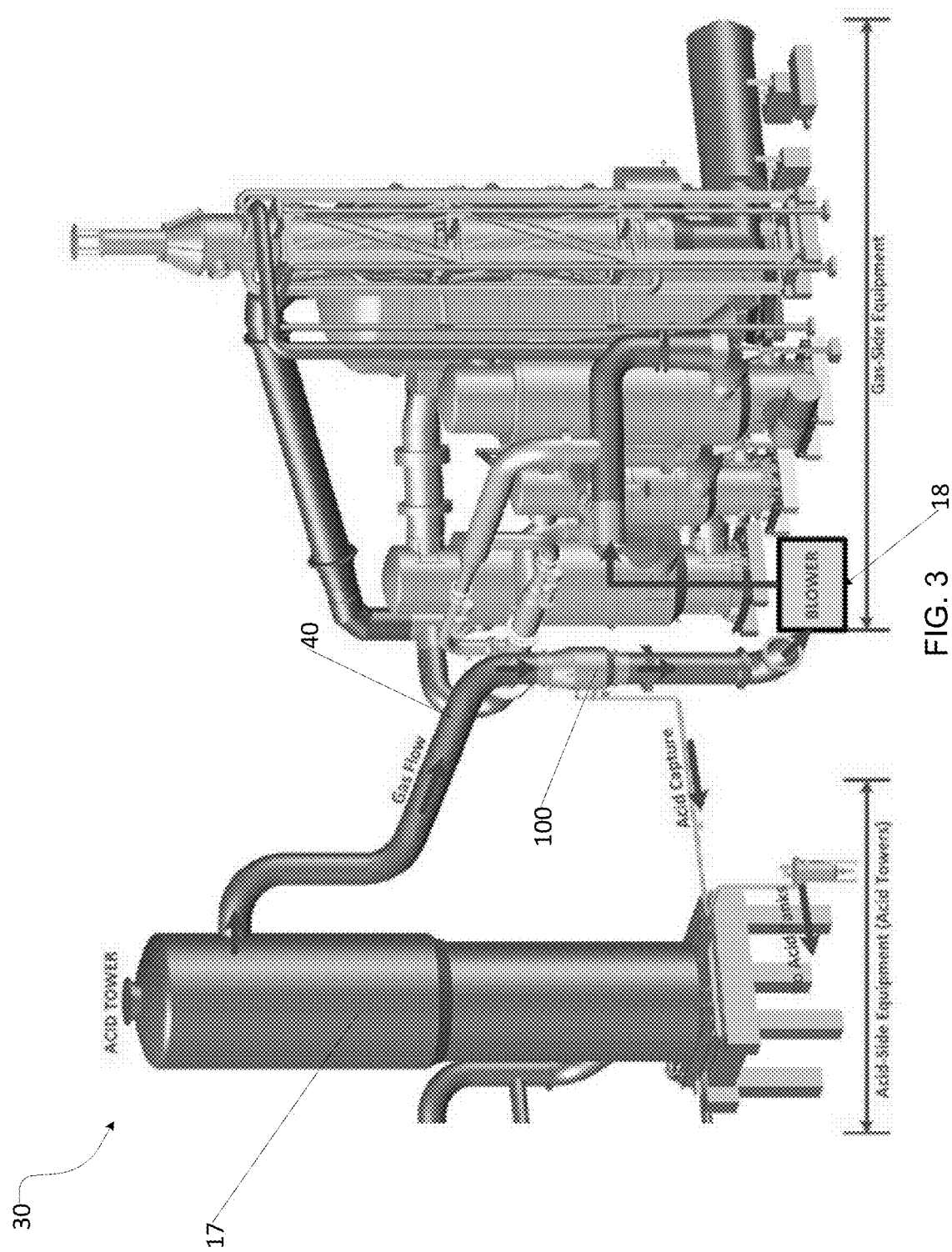
FIG. 3 is a schematic illustration of a sulphuric acid plant according to an example embodiment of the present invention.

A sulphuric acid plant 30 modified to include an entrainment separator 100 according to an example embodiment of the present invention is shown in FIG. 3. Many features and components of plant 30 are similar to features and components of plant 10, with the same reference numerals being used to indicate features and components that are similar between the embodiments. Plant 30 includes gas transfer system 40 to transfer process gas through plant 30. A separator 100 is located in-line with gas transfer system 40. In the FIG. 3 embodiment, separator 100 is installed in-line with gas transfer system 40 downstream of dry tower 17 and upstream of gas blower 18. In the FIG. 3 embodiment, separator 100 is installed in a vertical orientation. However, persons skilled in the art will recognize that separator 100 may be installed in any orientation suitable for the corresponding application.

Figure 4:
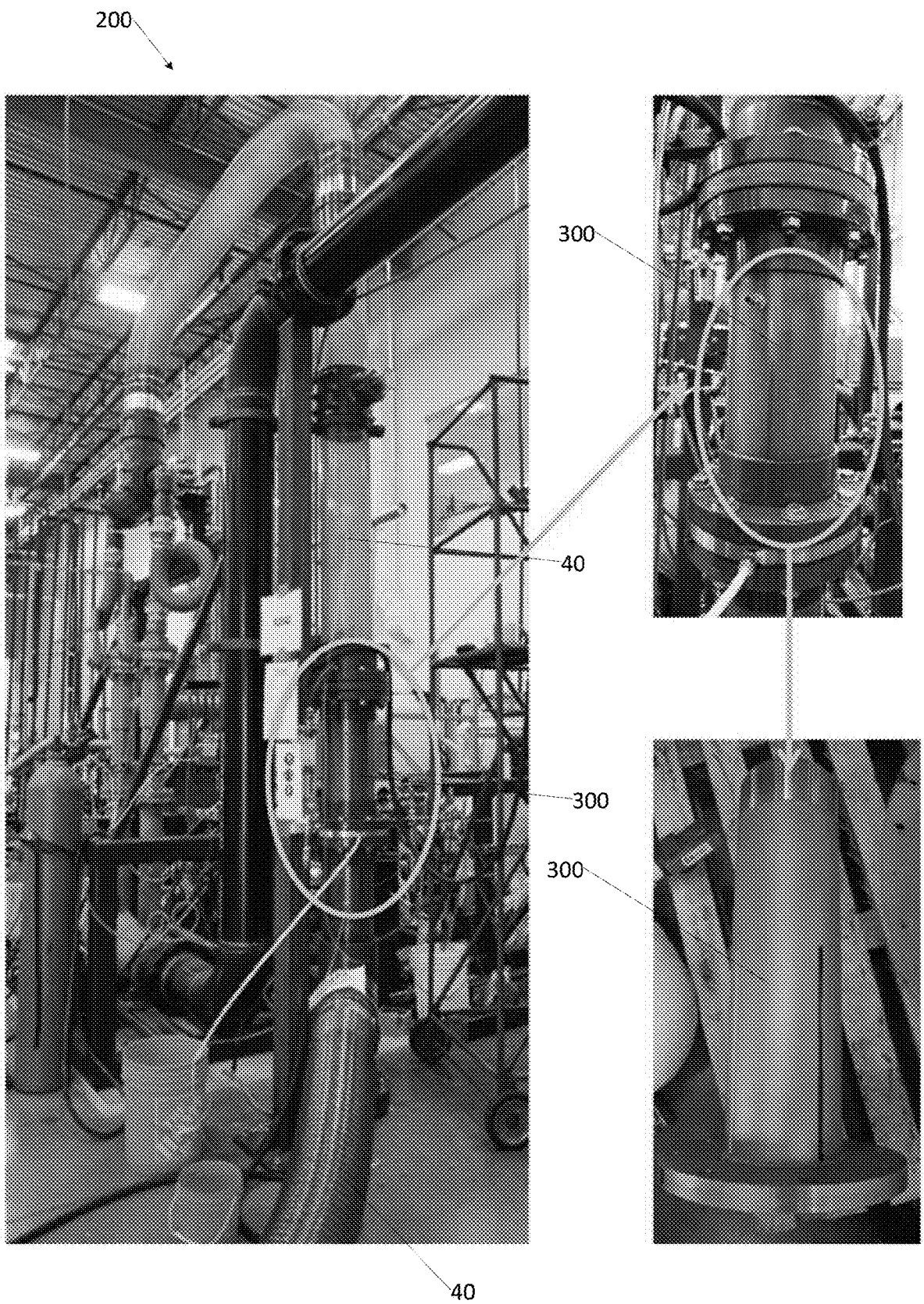
FIG. 4 is photographs of a pilot-scale test of a separator according to an example embodiment of the present invention installed in the ducting of a sulphuric acid plant.

A gas transfer system 200 modified to include an in-line entrainment separator 300 according to an example embodiment of the present invention is shown in FIG. 4. Separator 300 is located in-line with gas transfer system 40 and is installed in a vertical orientation. Separator 300 may, for example, be used as separators 100 in the embodiments illustrated in FIGS. 2, 3, and 5.

Since separator 100 may be connected in-line with a conduit carrying process gas, separator 100 may not require dedicated process vessels, pumps, liquid circulation, or electricity to operate. Separator 100 may not require the addition of chemicals or fiber beds or pads to operate. Instead, entrainment is separated from process gas by contact with surfaces as the process gas flows through separator 100. The separated entrainment is then removed by one or more of gravitational, inertial, and centrifugal forces. The resulting liquid (which comprises sulphuric acid in some embodiments) may be collected or fed back (i.e. recycled) into a gas treatment system.

The processes and devices according to some embodiments of the present invention may be located in-line with existing plant or process equipment and/or integrated into a process vessel. Such embodiments minimize downstream problems related to acid condensation and corrosion without inducing a large added pressure drop.

The processes and devices according to some embodiments of the present invention may be operative to precondition (i.e. rectify and/or pre-whirl) process gas to increase the mechanical efficiency of downstream rotating equipment. For example, the processes and devices are well-suited for use in sulphuric acid plants upstream of rotating equipment, such as blowers.

The processes and devices according to some embodiments of the present invention may be operative to homogeneously mix multiple streams of gas for further processing in addition to separating entrainment. Examples include, without limitation:

- Mixing process gas of different compositions and/or concentrations upstream of a unit operation (e.g. a packed-bed catalytic converter) that requires uniform composition and/or uniform concentration to achieve maximum performance.
- Mixing process gas of different temperatures to provide a homogeneous temperature profile for downstream operations (e.g. heat exchangers).

Figure 5:
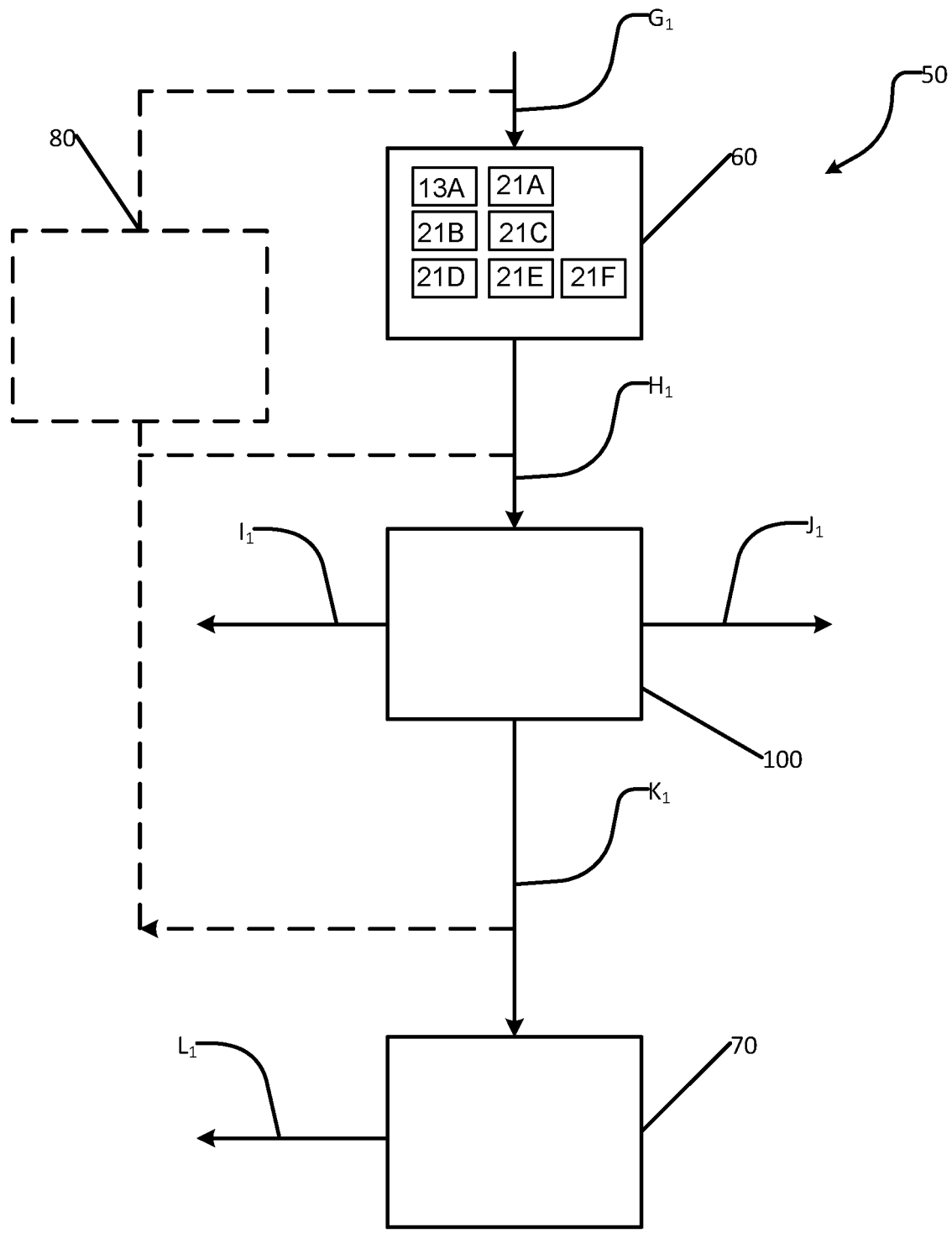
FIG. 5 is a schematic illustration of a gas treatment system according to an example embodiment of the present invention.

A gas treatment system 50 for generating sulphuric acid according to an example embodiment of the present invention is shown in FIG. 5. System 50 includes a source of process gas 60 and separator 100. Feedstock G1 is fed to source of process gas 60. Persons skilled in the art will recognize that source of process gas 60 depends on the gas treatment system type. Source 60 may include multiple unit operations and/or equipment involving contact between liquid and gas. In some embodiments, source 60 comprises one or more of a quench tower 21A, quench venturi, gas cooling tower 21C, spray tower, reverse-jet tower, dry sulphuric acid tower 21D, gas-liquid contactor 13A, well, tower (e.g., absorption tower 21B and final acid tower 21E), scrubber (e.g., tail gas scrubber 21F), column, condenser, evaporator, and coalescer.

Process gas $H_1$ produced via source 60 is fed into separator 100 to separate entrainment before gas $H_1$ is further processed as process gas $K_1$ and/or discharged as gas $I_1$ to the environment. Entrainment separated by separator 100 may be discharged and/or collected and/or recycled as liquid $J_1$. Liquid $J_1$ may be removed from separator 100 using one or more of gravitational, inertial, and centrifugal forces.

Process gas $K_1$ from separator 100 may be transferred to unit operations 70 for further processing before it is discharged as gas $L_1$ to the environment. Persons skilled in the art will recognize that the specific nature of unit operations 70 will depend on the gas treatment system type. For example, unit operations 70 may include multiple unit operations and/or equipment, such as rotating equipment. In some embodiments, unit operations 70 comprises one or more of a wet electrostatic precipitator, wet-gas booster fan, chemical removing system, dry tower, and rotating equipment.

Where process gas $H_1$ is transferred to separator 100 under vacuum (e.g. where separator 100 is located on the suction side of a blower), additional driving force (e.g. blowers, fans, compressors, etc.) may not be required. Accordingly, separator 100 may be operative to improve the overall efficiency of system 50 without inducing a large added pressure drop.

In some embodiments, separator 100 induces a pressure drop of less than about 20 inches WC (i.e. less than about 0.72 psi or less than about 5 kPa). In some embodiments, separator 100 induces a pressure drop of less than about 10 inches WC (i.e. less than about 0.36 psi or less than about 2.5 kPa). In some embodiments, separator 100 induces a pressure drop of less than about 5 inches WC (i.e. less than about 0.2 psi or less than about 1.2 kPA). In some embodiments, separator 100 induces a pressure drop of less than about 3 inches WC (i.e. less than about 0.1 psi or less than about 750 Pa). In some embodiments, separator 100 induces a pressure drop in the range of about 0.5 inches WC to about 3 inches WC (i.e. between about 0.02 psi and about 0.1 psi or between about 125 Pa and about 750 Pa).

In some embodiments, the velocity of process gas $H_1$ feeding separator 100 is less than about 100 m/s. In some embodiments, the velocity is in the range of about 5 m/s to about 30 m/s. In some embodiments, the velocity is in the range of about 10 m/s to about 20 m/s.

A control system 80 may be configured to adjust the flowrate of one or more of feedstock $G_1$, process gas $H_1$, and gas $K_1$. Control system 80 may operate to monitor gas flowrates and/or equipment pressure drop in real time. In some embodiments, control system 80 is configured to monitor fouling. For example, control system 80 may monitor a pressure drop across separator 100 to determine if fouling of the separator is occurring. Isokinetic sampling of gas flow upstream and downstream of separator 100 may be performed using opacity meters and/or using other equipment/methods conventionally known. In sulphuric acid plant applications, conventional 'stick tests' may be used to detect separator fouling. Fouling may be detrimental to the performance of separator 100. Accordingly, detecting an undesired amount of fouling may indicate that separator 100 should be removed for cleaning and/or replaced.

Feedstock $G_1$, process gas $H_1$, and/or gas $K_1$ may be heated or cooled and/or pressurized or depressurized depending on the requirements of source 60, separator 100, and unit operations 70, respectively. For example, the temperature and pressure of process gas $H_1$ may respectively be less than about 1,000° C. and less than about 10 bar. In some embodiments, the temperature and pressure of process gas $H_1$ are respectively between about 20° C. and about 100° C. and between about 0 bar and about +3 bar. In some embodiments, the temperature and pressure of process gas $H_1$ are respectively between about 20° C. and about 45° C. and between about 0.5 bar and about +1.5 bar. Separator 100 is generally suitable for separating entrainment from process gas $H_1$ under conditions where the material to be separated is present in liquid form.

Figure 6:
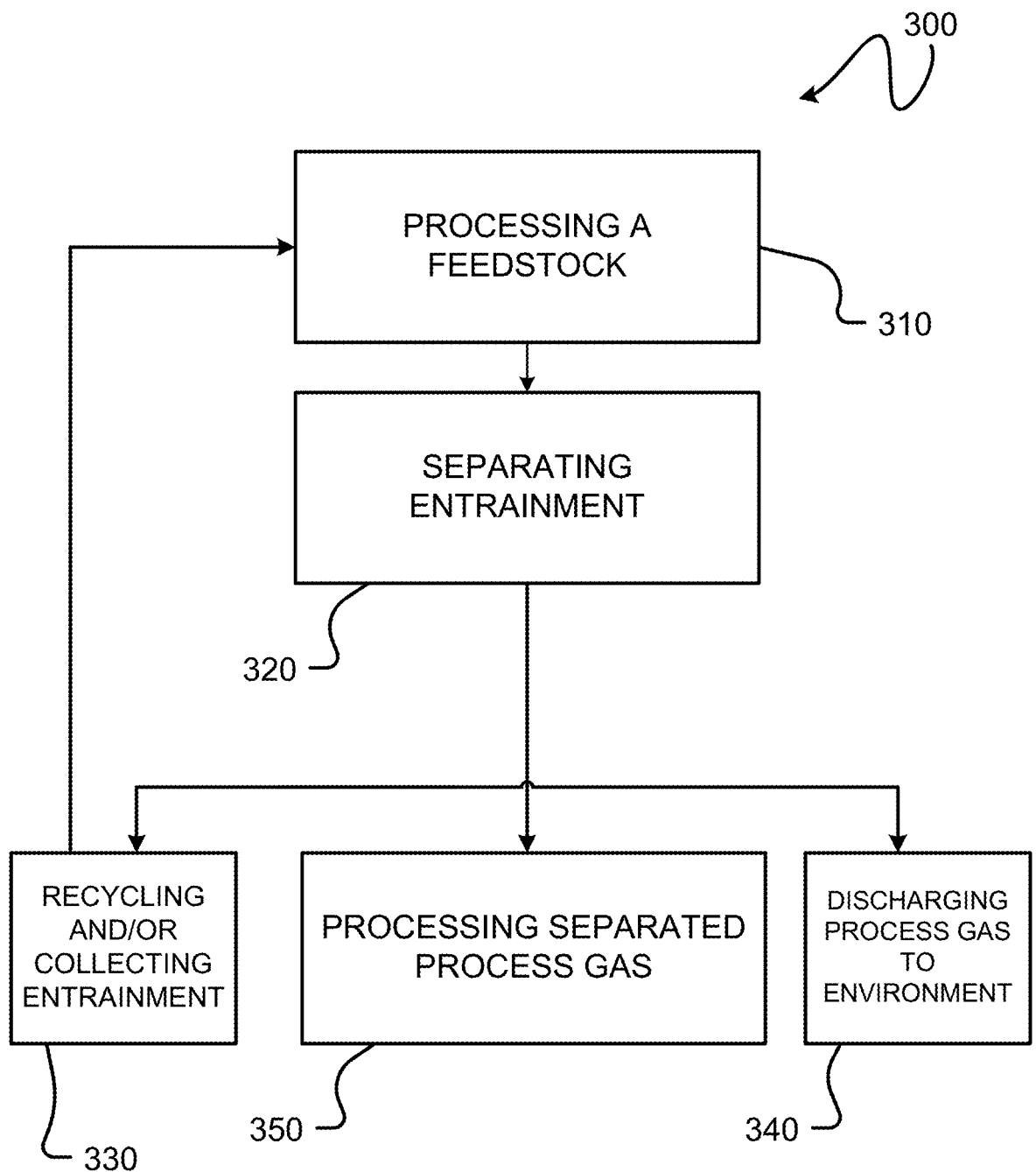
FIG. 6 is a flow chart which illustrates processes for separating entrainment in process gas according to an example embodiment of the present invention.

A gas treatment process 300 for generating sulphuric acid according to an example embodiment of the present invention is shown in FIG. 6. The process involves separating entrainment from a process gas. In block 310 a feedstock is processed by a sulphuric acid plant or component(s) thereof, wherein processing the feedstock involves contacting a liquid with a gas to yield a process gas containing entrainment. In block 320 the process gas is passed through separator 100 to separate entrainment. The separated entrainment may be collected and/or recycled in block 330. Separated entrainment may be recycled to, for example, block 310. The separated process gas may be and/or discharged to the environment in block 340 and/or further processed by downstream operation units in block 350. In some embodiments, the separated process gas is transferred to rotating equipment and/or a conventional entrainment eliminator in block 350 prior to subsequent processing, as described elsewhere herein.

Separators 400 according to example embodiments of the present invention are shown in FIGS. 7A-8B. Such separators may, for example, be used as separators 100 in the embodiments illustrated in FIGS. 2 to 5. The illustrated separators 400 may be used in conjunction with a variety of gas treatment systems, such as sulphuric acid plant 10 or 20 or 30 (FIGS. 1-3), where it is desirable to separate entrainment from process gas.

Separator 400 defines a plurality of surfaces for collecting liquid entrainment disengaged from process gas. Each surface defines one or more apertures or slots, through which collected liquid may be removed by one or more of gravitational, inertial, and centrifugal forces. The liquid may be collected or recycled for reuse (e.g. by gas treatment system 50).

Separator 400 comprises a plurality of tubes 120 extending along a longitudinal axis 106 of separator 400 and a gas flow altering device such as a vane 160 positioned in one or more tubes 120. Gas flow through separator 400 is altered by vane 160 (e.g. rotation is imparted to gas flowing through a tube 120 and/or gas flowing through the tube is mixed). The flow of gas through tube 120 brings entrainment into contact with one or more surfaces 122 in each tube 120. The entrainment is thus disengaged from the process gas. In some embodiments, each surface 122 comprises at least one aperture or slot 124 (see FIGS. 9A and 9B) for removing collected liquid. In some embodiments (see FIGS. 8A and 8B), separator 400 includes at least one drain 130 for draining liquid collected from tubes 120 and/or at least one inspection port 140 for viewing the operation of and/or repairing separator 400.

In some embodiments, the number, diameter, and/or lengths of tubes 120 is configured to optimize entrainment separation. For example, where separator 400 is retrofit in-line with existing gas treatment system ducting (e.g. ducting 40 (FIGS. 3 and 4), the total cross-section area of tubes 120 may be selected to be approximately equal to or greater than the cross-sectional area of the ducting in-line with separator 400.

For example, in a separator 400 having 31 tubes 120 each tube 120 may have a cross sectional area of approximately $1/31$ of the cross sectional area of the ducting into which separator 400 is connected in line. Providing plural tubes 120 increases the area of surface that can contact entrainment so that the entrainment is separated from process gas flowing through separator 400. For example, 31 tubes having a diameter of $D \times (31)^{-1/2}$ have the same total cross sectional area as a circular duct having a diameter D. However, the total surface area per unit length of the walls of 31 tubes having diameter D is greater by a factor of $(31)^{-1/2}$ than the surface area per unit length of the wall of a single round duct of diameter D. Additionally, in a smaller diameter tube 120, entrainment will on average be closer to a wall of the tube where it can be removed from a flow of process gas by contacting the tube wall. However, if tubes 120 are made too narrow undesirable choking may occur. Thus, the number and diameter of tubes 120 may be selected to optimize separation of entrainment while maintaining a desirably low gas pressure drop across separator 400.

As the number of tubes 120 is increased a diameter of each tube 120 may be decreased to meet any limits on the size of separator 400. The specific configuration of separator 400 may, therefore, depend on the configuration of the gas transfer system that separator 400 is retrofit into and/or other sizing limitations. For example, the diameter of separator 400 and the number and diameter of tubes 120 disposed therein may depend on the diameter of ducting 40.

In some embodiments, tubes 120 have a diameter in the range of about 1 inch (about 2 ½ cm) to about 8 inches (about 20 cm). Tubes 120 typically have lengths not exceeding about 2 meters. In some embodiments, tubes 120 have a diameter of about 6 inches (about 15 cm) and a length in the range of about 0.5 meter to about 1 meter. In some embodiments, separator 400 has between about 20 and about 40 tubes 120. For example, in the FIG. 7B embodiment, separator 400 has 31 tubes 120.

In some embodiments, separator 400 comprises an upstream tube sheet 102 and a downstream tube sheet 104. A flange 102a, 104a extends radially outwardly from each respective tube sheet 102, 104 for optionally mounting separator 400 (for example, in-line with gas transfer system ducting, etc.).

In some embodiments separator 400 is constructed to allow a space surrounding tubes 120 to be purged or filled with inert gas (e.g. nitrogen ($N_2$) gas, air, etc.). The temperature and/or pressure of the gas may be adjusted to maintain a desired process gas temperature and/or pressure inside separator 400 and/or to regulate collection of liquid from tubes 120. In some embodiments separator 400 is constructed to allow the pressure inside separator 400 to be balanced.

Figure 8A:
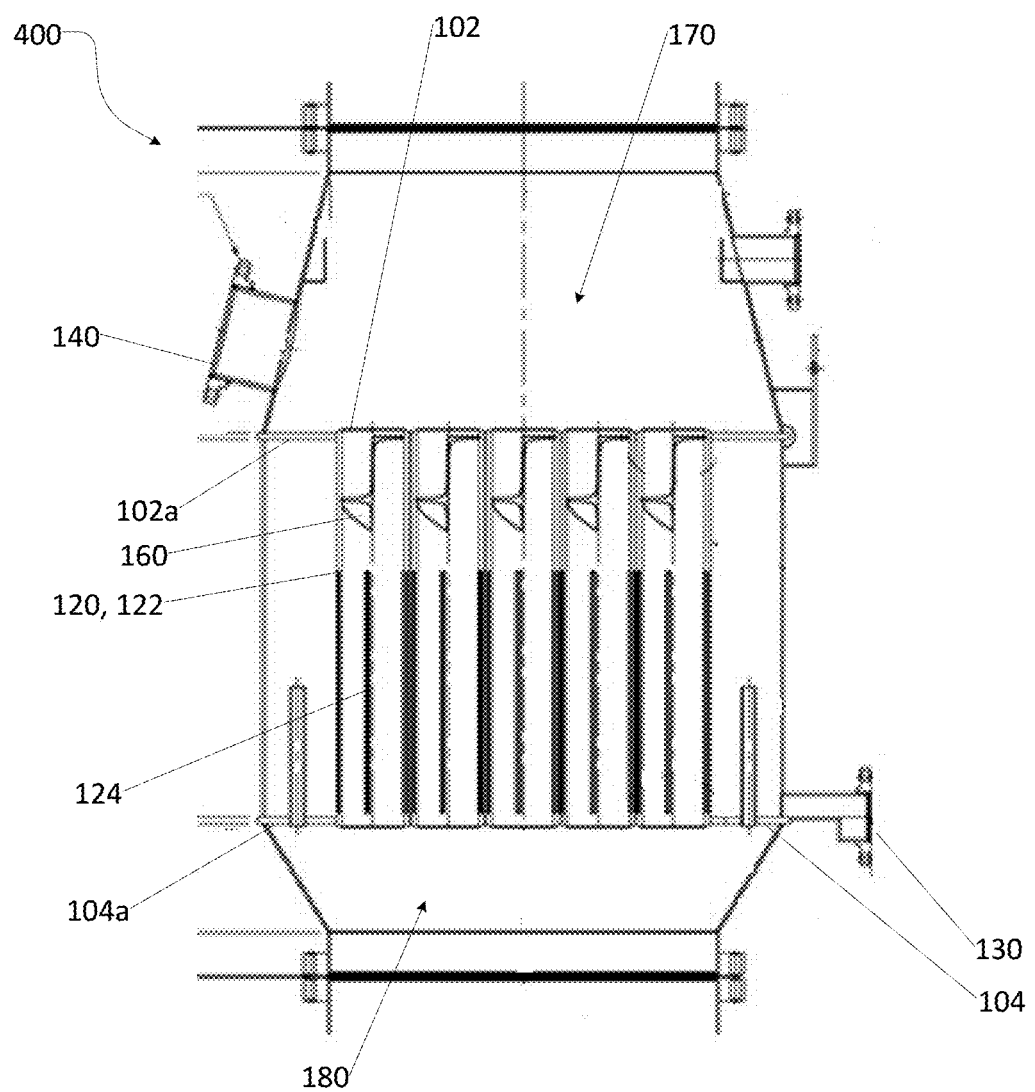
FIG. 8A is a side cross-sectional view of a separator according to an example embodiment of the present invention.
Figure 8B:
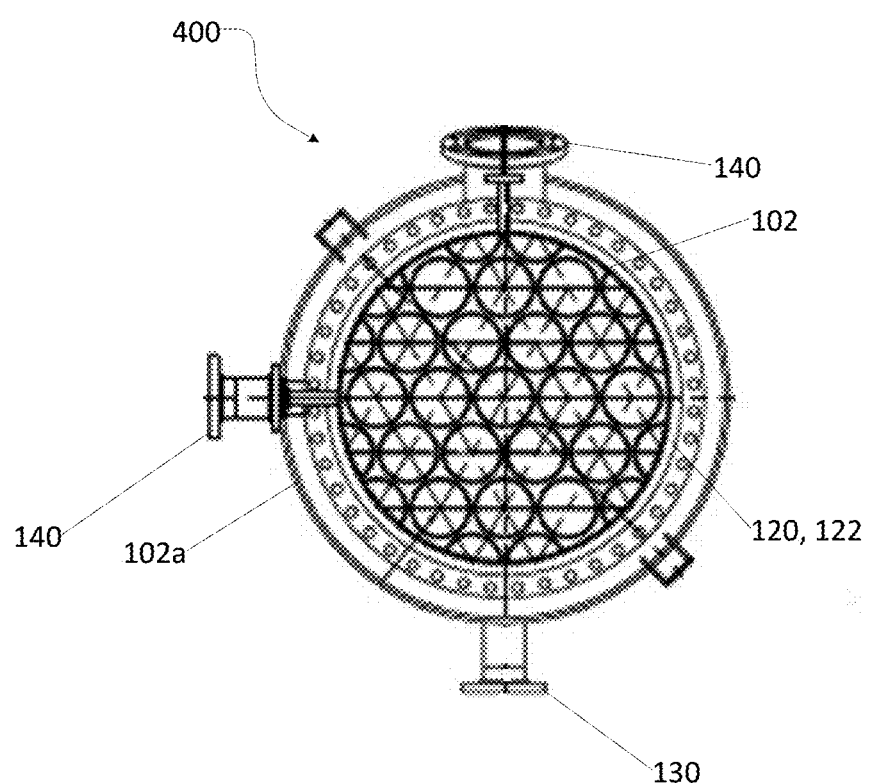
FIG. 8B is a top view of the separator shown in FIG. 8A.
Figure 9B:
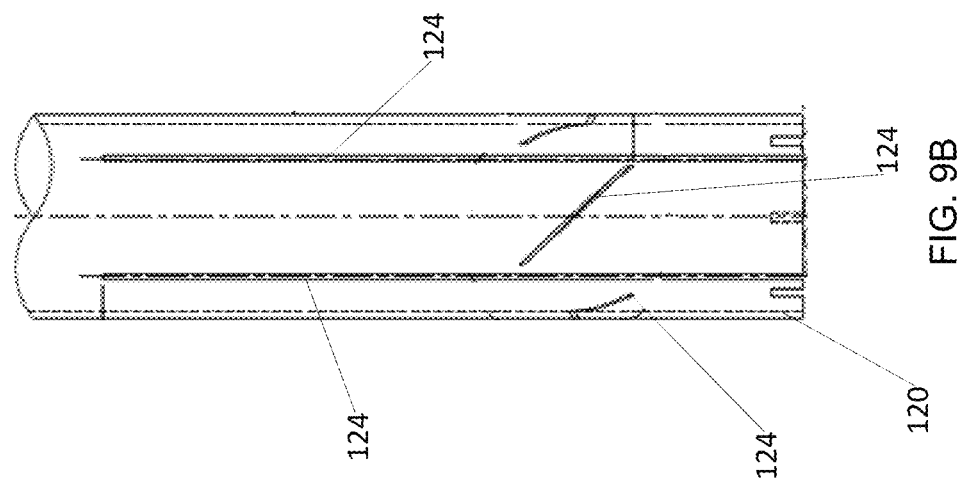
FIG. 9B is a partial side elevation view of the tube shown in FIG. 8A.
Figure 9A:
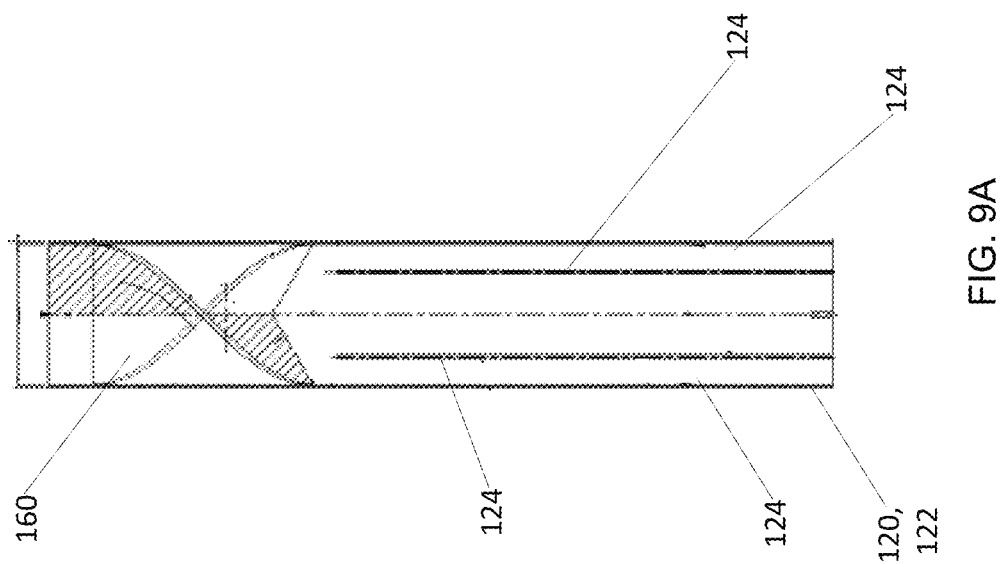
FIG. 9A is a side cross-sectional view of a tube of the separator shown in FIG. 8A.

As best shown in FIGS. 8A and 9A, to disengage entrainment from process gas, one or more tubes 120 of separator 400 may include a vane 160. Vane 160 promotes rotation of process gas as it flows through the separator. As the gas rotates, entrainment may be brought into contact with surface 122 of tube 120 and disengage from the process gas flow. As surface 122 becomes loaded with liquid, the liquid is removed from tube 120 via slot(s) 124.

To simplify manufacturing, vane 160 shown in FIGS. 9A, 10A-12D is located adjacent an upstream end of tube 120. However, persons skilled in the art would recognize that vane 160 may be located at one or more positions along the inside of tube 120 to promote a desired rotation of the process gas and effect collection of disengaged entrainment on surface 122. In some embodiments, the length of surface 122 downstream of vane 160 is selected to optimize collection of disengaged entrainment. In some embodiments, vane 160 comprises between about 0.5 to about 3 twists. In some embodiments, vane 160 comprises about 1 twist.

In some embodiments, vanes 160 are configured to achieve one or more of the following objectives:

Gas flow rectification: In some embodiments, vanes 160 are configured such that the gas flow downstream of tubes 120 (i.e. in downstream section 180 (FIG. 8A)) is essentially free of rotation and flows downstream of separator 400 with significantly no rotational speed.

Gas flow pre-rotation: In some embodiments, vanes 160 are configured such that the gas flow downstream of tubes 120 (i.e. in downstream section 180 (FIG. 8A)) rotates in essentially the same direction (i.e. clockwise or counter-clockwise) as the desired rotation of gas flow at an inlet end of downstream rotating equipment. In this way, the gas flow downstream of tubes 120 has a desired rotational speed and direction, which enhances the operating efficiency of downstream rotating equipment.

Pre-whirl is produced by giving air a whirl component through the use of vanes 160. A positive vane angle produces pre-whirl in the direction of impeller rotations and a negative vane angle produces pre-whirl in the opposite direction. Air pre-whirl in the direction of impeller rotation reduces rotating equipment work at a given RPM. Air pre-whirl counter to impeller rotation increases rotating equipment work. In this way, output power may be modified without having to change rotating equipment RPM. "The Use of Compressor-Inlet Prewhirl for the Control of Small Gas Turbines" by J. R. Anderson and A. R. Shouman, ASME, 1963 is hereby incorporated herein by reference for all purposes.

Example vane configurations include (without limitation):
twisted tape type (FIGS. 10A and 10B);
bullet-type (FIGS. 11A and 11B);
half disk type (not shown);
scroll type (not shown);
plate type (not shown).

Figure 10A:
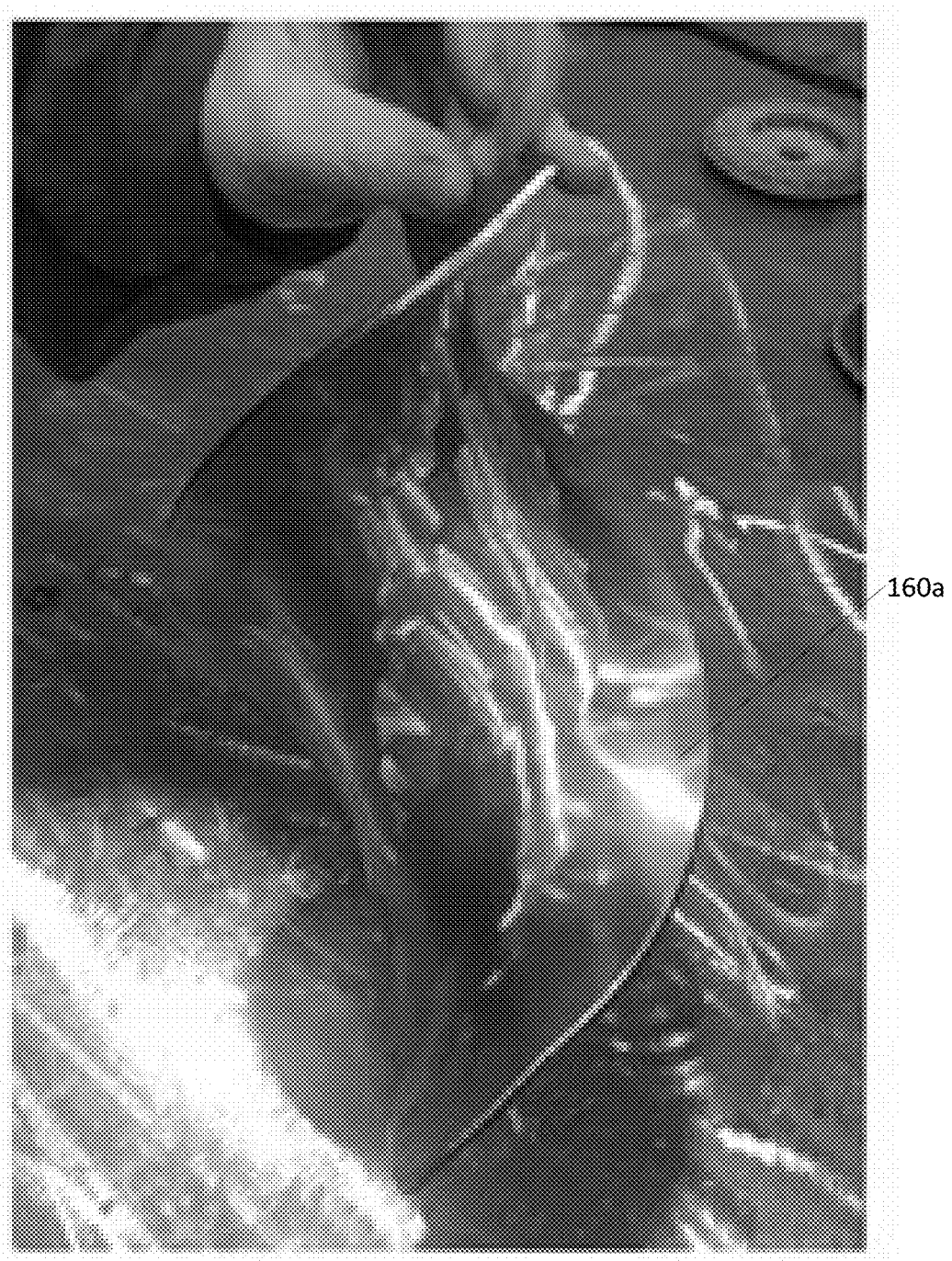
FIG. 10A is a side perspective view of a separator vane according to an example embodiment of the present invention.
Figure 10B:
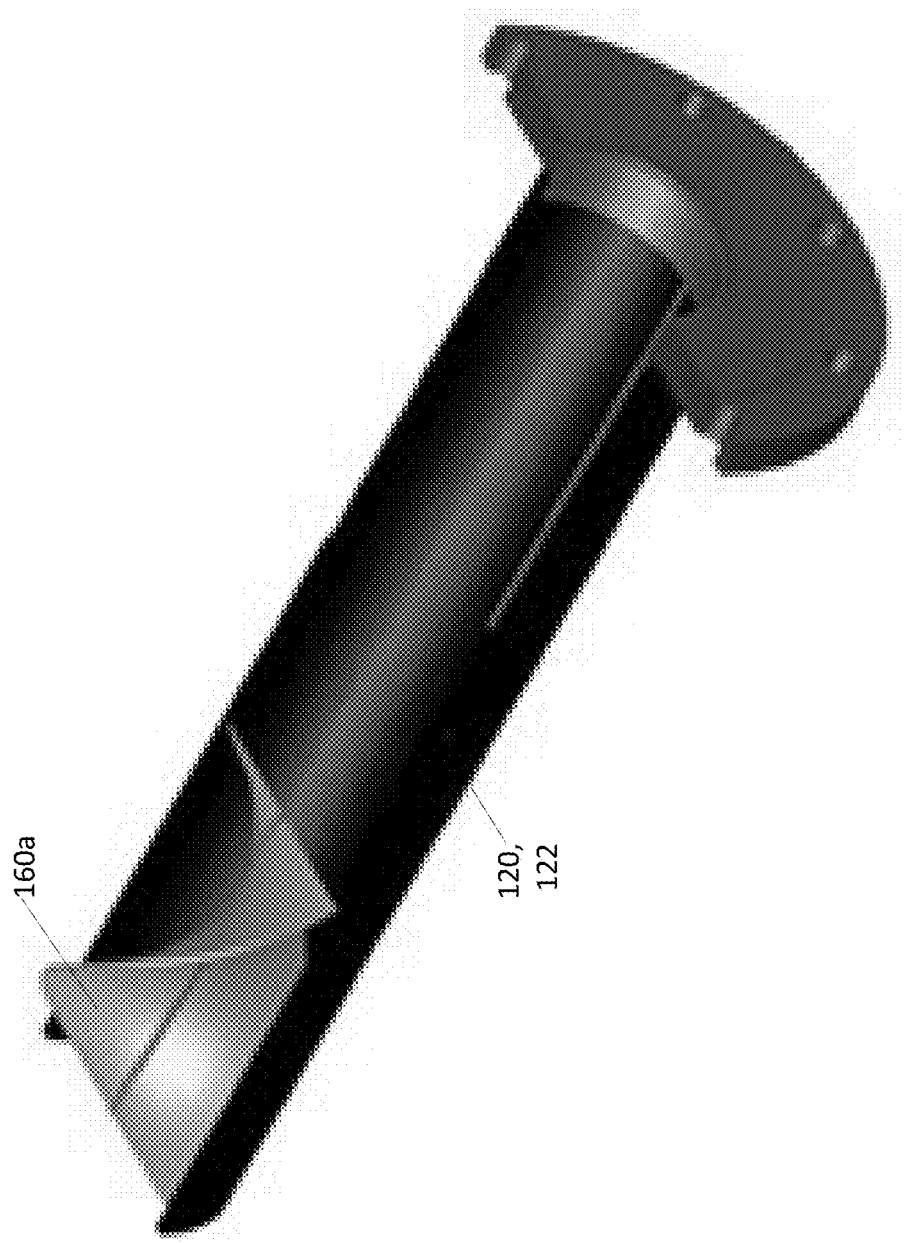
FIG. 10B is a bottom, side, cross-sectional view of the vane shown in FIG. 10A installed in the tube of a separator according to an example embodiment of the present invention.
Figure 11A:
FIG. 11A is a side perspective view of a separator vane according to an example embodiment of the present invention.
Figure 11B:
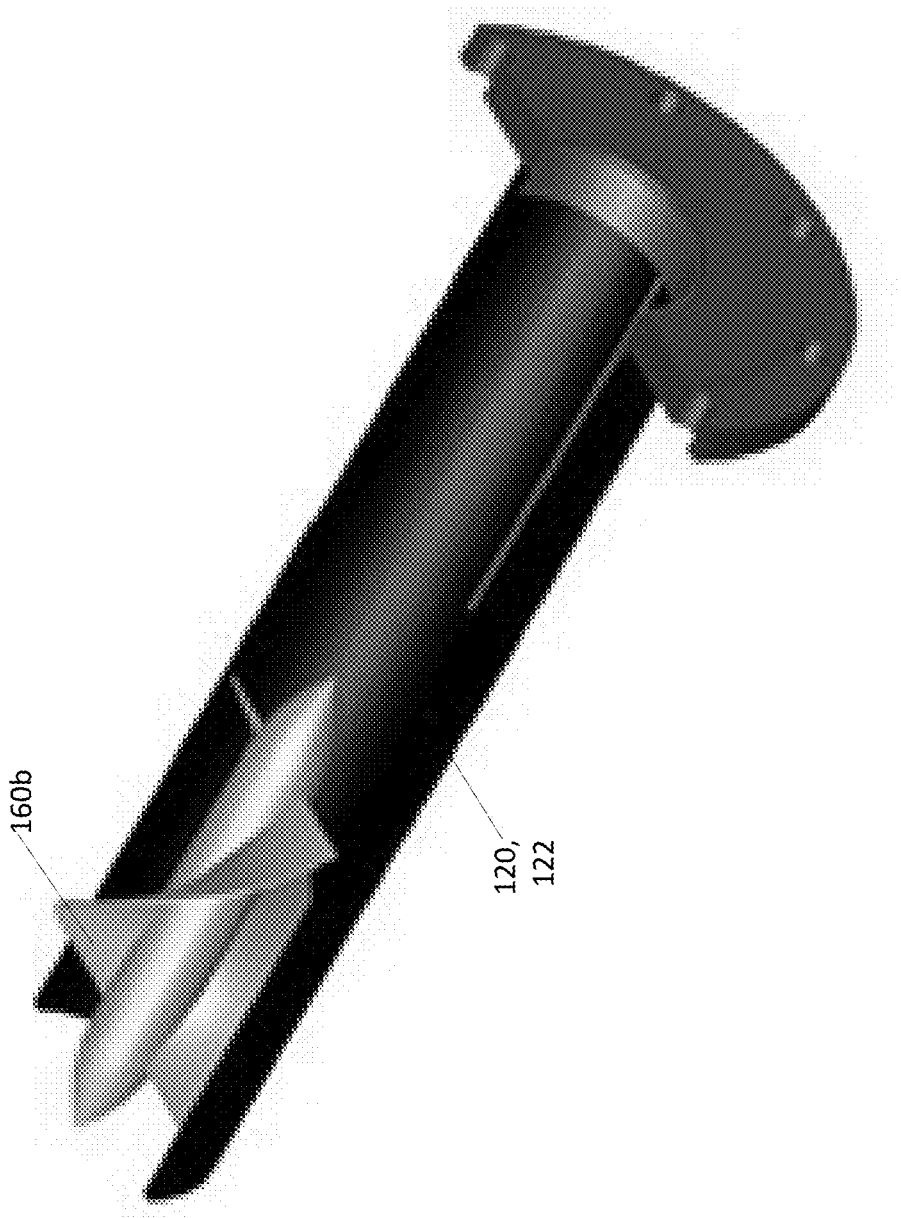
FIG. 11B is a bottom, side, cross-sectional view of the vane shown in FIG. 11A installed in the tube of a separator according to an example embodiment of the present invention.
Figures 12A, 12B, 12C, 12D:
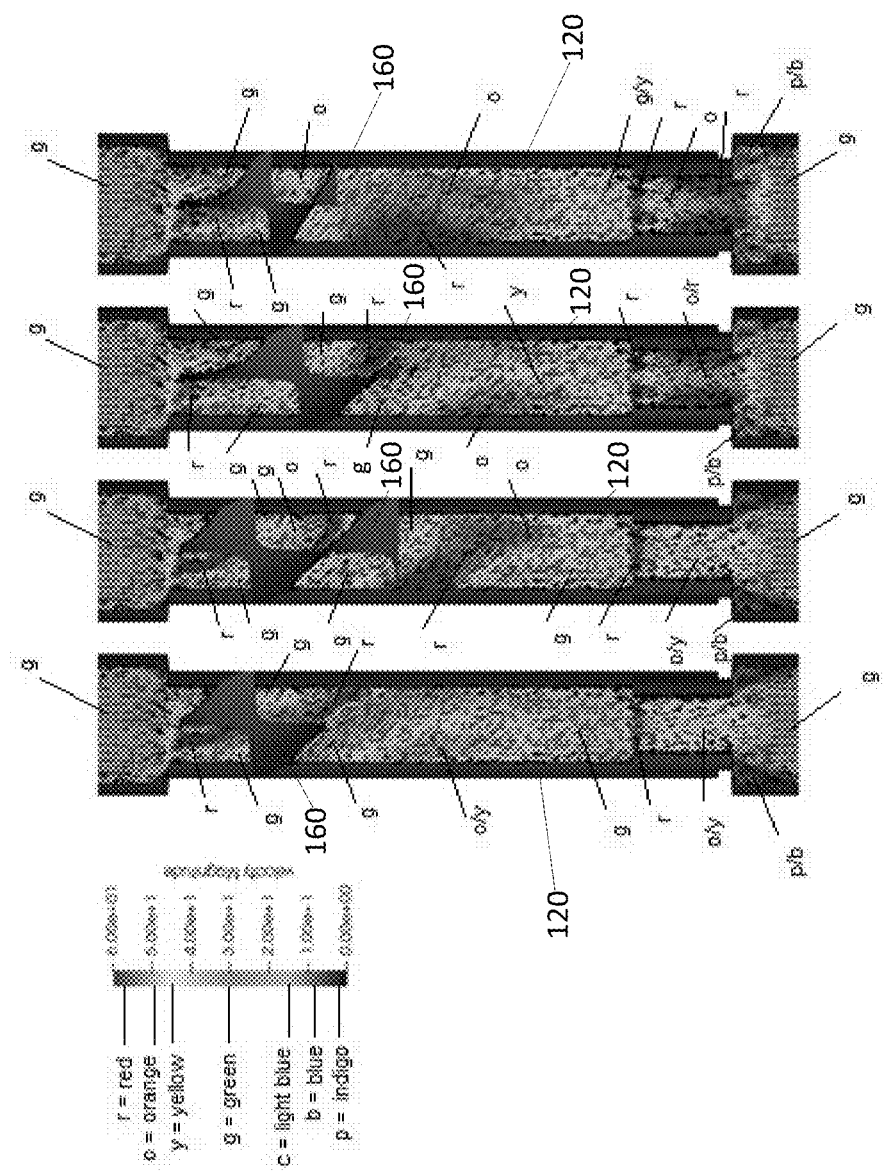
FIG. 12A is a computational fluid dynamic (CFD) prediction of gas flow through the tube of a separator according to an example embodiment of the present invention.
FIG. 12B is a CFD prediction of gas flow through the tube of a separator according to an example embodiment of the present invention.
FIG. 12C is a CFD prediction of gas flow through the tube of a separator according to an example embodiment of the present invention.
FIG. 12D is a CFD prediction of gas flow through the tube of a separator according to an example embodiment of the present invention.

The inventors have discovered that the twisted tape type vane shown in FIGS. 10A and 10B effects better entrainment removal efficiency in some separator embodiments than the bullet-type vane shown in FIGS. 11A and 11B.

Vanes 160 may have constant pitch blades or variable pitch blades.

FIGS. 12A-12D depict computational fluid dynamic (CFD) predictions of the effect of vane configuration (where the inlet length of the split plate of the vanes is varied) on gas flow velocity profiles. A higher pressure drop across tube 120 is predicted for the vane configurations shown in FIGS. 12A and 12B as compared to those shown in FIGS. 12C and 12D. By increasing the entry length of the split plate of vane 160, pressure drop is reduced without an appreciable impact on entrainment separation.

Figure 13:
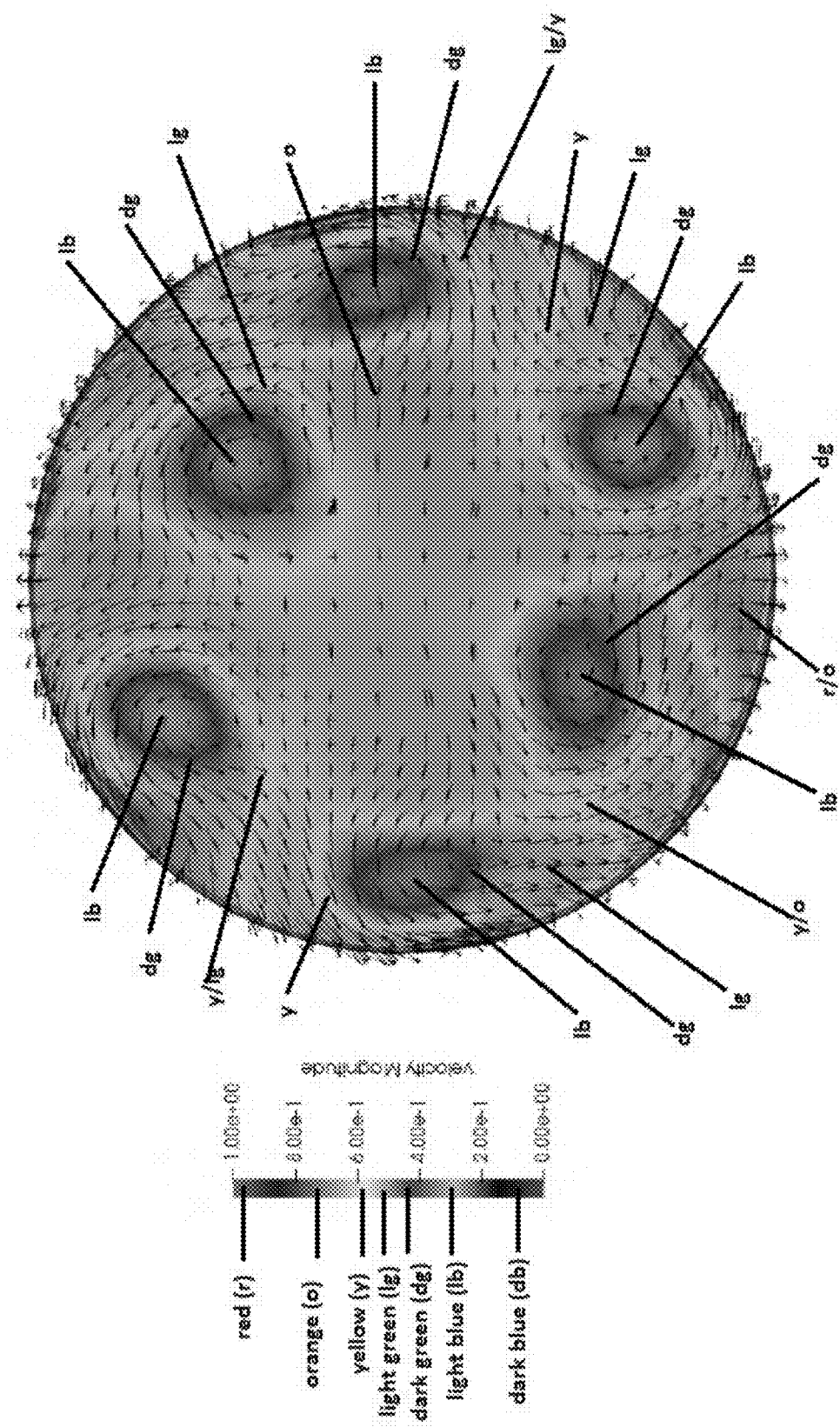
FIG. 13 is a CFD prediction of gas flow through the tube of a separator according to an example embodiment of the present invention.

FIG. 13 depicts a CFD prediction of a gas flow velocity profile through a cross-section of tube 120. Gas flow velocity adjacent surface 122 is reduced, which allows entrainment to disengage from process gas and separated liquid entrainment to be collected on surface 122. Gas flow velocity is greater across the center of tube 120.

Figure 14:
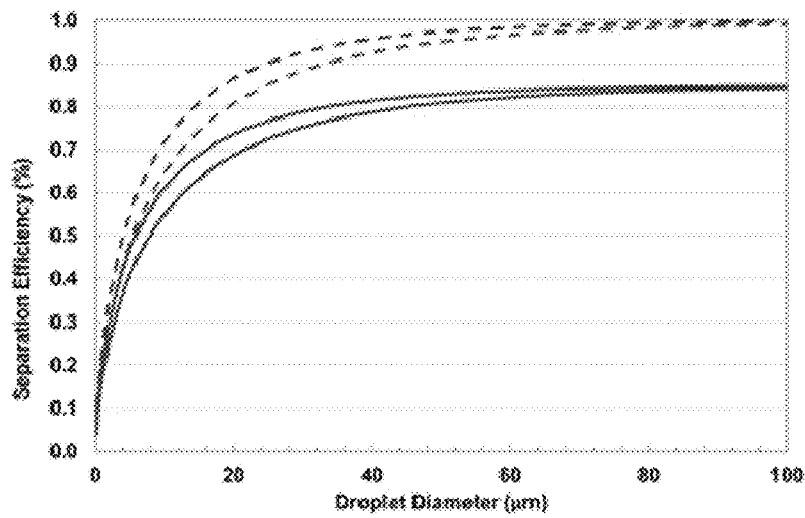
FIG. 14 is a graph of separation efficiency (%) of a separator according to an example embodiment of the present invention as a function of entrainment droplet diameter (μm).

Separators 100, 300, 400 are designed to achieve desired entrainment removal efficiencies as a function of process parameters and entrainment particle. For example, the efficiency (%) of a prototype separator 400 as a function of entrainment particle diameter (μm) is shown in FIG. 14.

Figure 15:
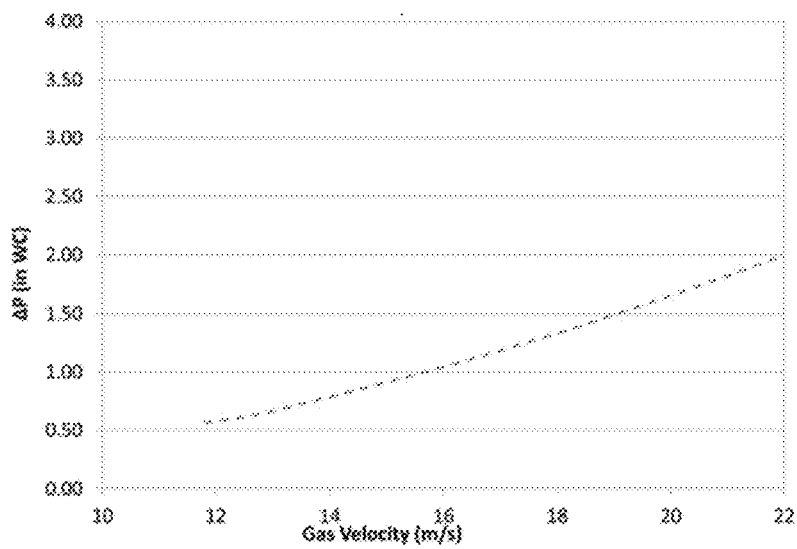
FIG. 15 is a graph of pressure differential (WC) across a separator according to an example embodiment of the present invention as a function of gas flow velocity (m/s) into the separator.

FIG. 15 depicts gas pressure drop (WC) as a function of gas velocity (m/s).

Compared to conventional entrainment eliminators, separator 400 removes entrainment having larger liquid droplet sizes without a large pressure drop across the device.

Figure 16:
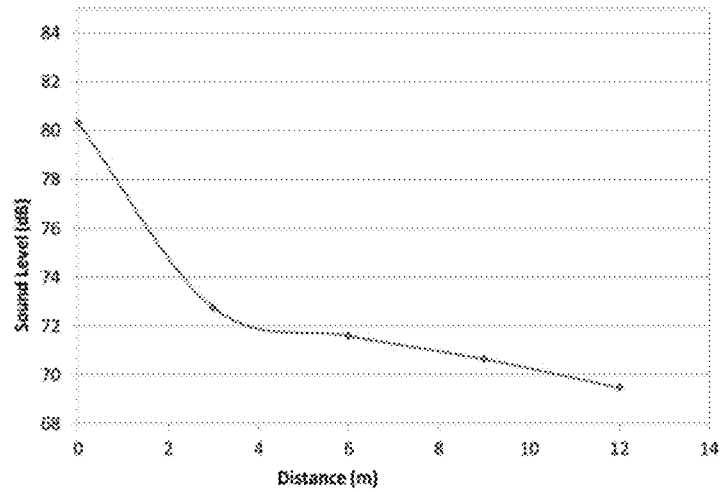
FIG. 16 is a graph of sound level (dB) emitted by a separator according to an example embodiment of the present invention as a function of the distance (m) from the separator during operation.

FIG. 16 shows the sound level (dB) produced by separator 400 depicted in in FIG. 4 as a function of the distance (m) from the separator. The sound levels observed would not be an impediment to employing separator 400 to separate entrainment in most industrial applications.

In some embodiments, separators 100, 300, 400 are suitable for separating entrainment that comprises less than about 20% by volume of the process gas. In some embodiments, separators 100, 300, 400 are suitable for separating entrainment that comprises less than about 5% by volume of the process gas.

Separators 100, 300, 400 are particularly well suited to separate larger particles of entrainment to improve the efficiency of and/or prevent corrosion and/or fouling of conventional entrainment eliminators. Separators 100, 300, 400 are generally restricted to separating entrainment having particle sizes in the micron range. In some embodiments, separators 100, 300, 400 are configured to separate entrainment having particle sizes greater than about 2 microns in the range. In some embodiments, separators 100, 300, 400 are configured to separate entrainment having particles of about 3 microns to about 100 microns. For said entrainment particle sizes, separators 100, 300, 400 according to some embodiments separate entrainment with an efficiency in the range of about 50% to about 100%. In some embodiments, separators 100, 300, 400 separate entrainment with an efficiency in the range of about 80% to about 100%.

Separators 100, 300, 400 are particularly well suited to separating entrainment that is denser than water. In sulphuric acid plant applications, separators 100, 300, 400 are suitable for separating sulphuric acid entrainment having a density between about 100 to about 2,000 times the density of the process gas. In some embodiments, separators 100, 300, 400 are suitable for separating sulphuric acid entrainment having a density between about 700 to about 2,000 times the density of process gas. In some embodiments, separators 100, 300, 400 are suitable for separating sulphuric acid entrainment having a density between about 1,200 and about 2,000 times the density of the process gas.

In some embodiments, separators 100, 300, 400 separate entrained sulphuric acid having a concentration in the range of about 90% wt./wt. $H_2SO_4$ to about 99% wt./wt. $H_2SO_4$. In some embodiments, separators 100, 300, 400 separate entrained sulphuric acid having a concentration in the range of about 92% wt./wt. $H_2SO_4$ to about 98.5% wt./wt. $H_2SO_4$. In some embodiments, separators 100, 300, 400 separate entrained sulphuric acid having a concentration in the range of about 93% wt./wt. In some embodiments, separators 100, 300, 400 separate entrained sulphuric acid having a concentration of less than about 30% wt./wt. In some embodiments, separators 100, 300, 400 are suitable for separating entrainment having a density between about 100 and about 2,000 times the density of the process gas. In some embodiments, separators 100, 300, 400 are suitable for separating entrainment having a density between about 700 and about 2,000 times the density of the process gas. In some embodiments, separators 100, 300, 400 are suitable for separating entrainment having a density between about 1,200 and about 2,000 times the density of the process gas.

In some embodiments, separators 100, 300, 400 (and the components thereof) are manufactured from conventional industrial materials resistant to corrosion, including (but not limited to) carbon steel, stainless steel, and lined steel (e.g. polytetrafluoroethylene-lined steel, etc.). For example, separators 100, 300, 400 may be manufactured with an all-metallic, all-welded design, in corrosion resistant materials, such as stainless steel 316L and/or high-silicon alloys.

In some embodiments, separators 100, 300, 400 lack moving parts or components and may be operated without operator intervention.

While a number of exemplary aspects and embodiments are discussed herein, those of skill in the art will recognize certain modifications, permutations, additions, and sub-combinations thereof. For example:
  process gas may be transferred from one or more sources of process gas to one or more separators;
  where process gas is transferred from more than one source of process gas, the sources of process gas may share a single gas transfer system;
  where process gas is transferred from more than one source of process gas, the separator may homogeneously mix the process gas;
  gas may be transferred from one or more separators to one or more unit operations;
  where process gas is transferred from more than one separator, the separators may share a single gas transfer system;
  where process gas is transferred from more than one separator, the separators may be located in different locations in a gas treatment system;
  where process gas is transferred from more than one separator, the separators may be positioned in sequence in a gas treatment system.

Persons skilled in the art will recognize that the different embodiments of the present invention may share fundamental scientific and/or engineering principles in common. The description of common aspects, if appearing under one embodiment, may not necessarily be repeated in the description of successive embodiments.

In addition to the design options for separators 100 as described herein the invention includes: the provision of separators for micron-sized entrainment at locations in sulphuric acid plants as described above (to better protect downstream equipment and/or augment the operation of other entrainment eliminators that may be present); the provision of separators having the constructions as described herein in sulphuric acid plants, for example at the locations described herein; methods for removing entrainment as described herein; etc.

The processes and systems described herein may include a control unit to perform various system- and component-level control functions as described elsewhere herein. The control unit, together with all instrumentation and signal lines, are not shown for simplicity.

Interpretation of Terms

Unless the context clearly requires otherwise, throughout the description and the claims:
- "comprise", "comprising", and the like are to be construed in an inclusive sense, as opposed to an exclusive or exhaustive sense; that is to say, in the sense of "including, but not limited to";
- "connected", "coupled", or any variant thereof, means any connection or coupling, either direct or indirect, between two or more elements; the coupling or connection between the elements can be physical, logical, or a combination thereof;
- "herein", "above", "below", and words of similar import, when used to describe this specification, shall refer to this specification as a whole, and not to any particular portions of this specification;
- "or", in reference to a list of two or more items, covers all of the following interpretations of the word: any of the items in the list, all of the items in the list, and any combination of the items in the list;
- the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

While processes or blocks are presented in a given order, alternative examples may perform processes or blocks in a different order. Some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

Where a component (e.g. a duct, tube, pump, impeller, vane, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and subcombinations as may reasonably be inferred. The scope of the claims should not be limited by the preferred embodiments set forth in the examples, but should be given the broadest interpretation consistent with the description as a whole.

The invention claimed is:

1. A sulphuric acid plant comprising:
    a source of process gas comprising a gas-liquid contactor selected from a packed tower and a contact condenser, the process gas containing sulphuric acid entrainment;
    an entrainment eliminator;
    a rotating equipment located downstream of the gas-liquid contactor; and
    a separator located downstream of the entrainment eliminator and upstream of the rotating equipment, the separator comprising a plurality of tubes, each tube comprising a vane extending longitudinally along the tube, wherein the vane rotates a process gas flowing through the separator.

2. The sulphuric acid plant according to claim 1 wherein the source of process gas comprises one or more of a dry tower, a quench tower, an absorption tower, and a gas cooling tower.

3. The sulphuric acid plant according to claim 2 comprising an additional separator upstream from the entrainment eliminator, the additional separator comprising a plurality of tubes, each tube comprising a twisted vane extending longitudinally along the tube.

4. The sulphuric acid plant according to claim 2 comprising one or more additional separators, each of the additional separators comprising a plurality of tubes, each tube comprising a twisted vane extending longitudinally along the tube, the one or more additional separators located at one or more of:
- downstream of a gas-liquid contactor of a gas cleaning section of the sulphuric acid plant;
- downstream of a dry sulphuric acid tower of the sulphuric acid plant;
- downstream of a final acid tower of the sulphuric acid plant; and
- downstream of a tail gas scrubber of the sulphuric acid plant.

5. The sulphuric acid plant according to claim 1 wherein the vane comprises a positive vane angle to rotate the process gas in a desired rotation of a gas flow at an inlet end of the rotating equipment.

6. The sulphuric acid plant according to claim 5 wherein the vane comprises about 0.5 to about 3 twists.

7. The sulphuric acid plant according to claim 5 wherein the vane comprises one twist.

8. The sulphuric acid plant according claim 1 comprising a gas transfer system for transferring the process gas from the entrainment eliminator to the separator, wherein the separator is located in-line with the gas transfer system.

9. The sulphuric acid plant according to claim 8 wherein a total cross sectional area of the plurality of tubes is approximately equal to a cross sectional area of the gas transfer system located in-line with the separator.

10. The sulphuric acid plant according to claim 1 wherein each of the tubes comprises an inside surface for collecting entrainment having particle sizes in the range of about 3 microns to about 100 microns.

11. The sulphuric acid plant according to claim 1 wherein the separator is configured to separate entrainment from the process gas with a pressure drop across the separator of less than about 5 kPa.

12. The sulphuric acid plant according to claim 11 wherein each of the tubes comprises an inside surface for collecting entrainment separated from the process gas and a drain for removing the separated entrainment from the separator.

13. The sulphuric acid plant according to claim 1 wherein the separator is configured to separate entrainment from the process gas with a pressure drop across the separator of less than about 750 Pa.

14. A sulphuric acid plant comprising:
- a source of process gas comprising a gas-liquid contactor selected from a packed tower and a contact condenser, the process gas containing sulphuric acid entrainment;
- an entrainment eliminator;
- a rotating equipment located downstream of the gas-liquid contactor;
- a separator located downstream of the source of process gas and upstream of the rotating equipment, wherein the separator comprises:
- a plurality of tubes extending along a longitudinal axis of the separator, each tube comprising a vane extending longitudinally along the tube, wherein each vane is twisted to rotate a process gas flowing through the separator; and
- a gas transfer system for transferring the process gas from the source of process gas to the separator,
- wherein the separator is located in-line with the gas transfer system to separate the entrainment from the process gas and is configured to operate with a pressure drop across the separator of less than about 5 kPa.

15. The sulphuric acid plant according to claim 14 wherein the pressure drop across the separator is less than about 750 Pa.

16. The sulphuric acid plant according to claim 14 wherein the entrainment eliminator is located downstream of the separator.

17. The sulphuric acid plant according to claim 16 wherein the source of process gas comprises a dry sulphuric acid tower.

18. The sulphuric acid plant according to claim 17 wherein the entrainment has particle sizes in the range of about 3 microns to about 100 microns.

19. The sulphuric acid plant according to claim 14 wherein the vane comprises a positive vane angle to rotate the process gas in a desired rotation direction for gas flow at an inlet end of the rotating equipment.

20. The sulphuric acid plant according to claim 19 wherein the vane comprises about 0.5 to about 3 twists.

21. The sulphuric acid plant according to claim 20 wherein the vane has one twist.

* * * * *